US011438861B2

(12) United States Patent
Nurminen et al.

(10) Patent No.: US 11,438,861 B2
(45) Date of Patent: Sep. 6, 2022

(54) USING MOTION STATE OF MOBILE DEVICE FOR POSITION ESTIMATE

(71) Applicant: HERE GLOBAL B.V., Eindhoven (NL)

(72) Inventors: Henri Nurminen, Tampere (FI); Lauri Aarne Johannes Wirola, Tampere (FI); Pavel Ivanov, Tampere (FI); Matias Mikkola, Tampere (FI)

(73) Assignee: HERE GLOBAL B.V., Eindhoven (NL)

(*) Notice: Subject to any disclaimer, the term of this patent is extended or adjusted under 35 U.S.C. 154(b) by 0 days.

(21) Appl. No.: 16/596,802

(22) Filed: Oct. 9, 2019

(65) Prior Publication Data

US 2020/0120631 A1   Apr. 16, 2020

(30) Foreign Application Priority Data

Oct. 15, 2018 (EP) .................................... 18200485

(51) Int. Cl.
*H04W 64/00* (2009.01)
*H04M 1/02* (2006.01)
*H04W 24/08* (2009.01)

(52) U.S. Cl.
CPC ......... *H04W 64/00* (2013.01); *H04M 1/0202* (2013.01); *H04W 24/08* (2013.01); *H04M 2250/12* (2013.01)

(58) Field of Classification Search
CPC ........... H04M 1/0202; H04M 2250/12; H04W 24/08; H04W 4/025; H04W 64/00;

(Continued)

(56) References Cited

U.S. PATENT DOCUMENTS

| | | | |
|---|---|---|---|
| 6,609,080 B1 * | 8/2003 | Syrjarinne | H03H 17/0257 |
| | | | 702/150 |
| 2005/0136845 A1 * | 6/2005 | Masuoka | G01S 1/68 |
| | | | 455/67.14 |

(Continued)

FOREIGN PATENT DOCUMENTS

WO    WO 20171452300 A1    9/2017

OTHER PUBLICATIONS

Extended European Search Report for Application No. EP 18 20 0485 dated Apr. 8, 2019, 8 pages.

(Continued)

*Primary Examiner* — Erica Navar
(74) *Attorney, Agent, or Firm* — Alston & Bird LLP

(57) ABSTRACT

Described is a method that includes taking radio measurements of radio node signals observable at a mobile device; obtaining motion measurement data indicative of motion of the mobile device; determining, based on the motion measurement data, a motion state of the mobile device; and providing the radio measurements taken or information representative thereof and the motion state or information representative thereof. Described is also a method that includes obtaining radio measurements of radio node signals observable at a mobile device or information representative thereof obtaining a motion state of the mobile device, the motion state having been determined based on motion measurement data indicative of motion of the mobile device, or information representative thereof determining a position estimate of the mobile device at least based on at least some radio measurements or information representative thereof and the obtained motion state of the mobile device or the information representative thereof.

21 Claims, 15 Drawing Sheets

(58) Field of Classification Search
CPC ..... G01C 21/16; G01S 5/0036; G01S 5/0252; G01S 5/0257; G01S 5/0263
See application file for complete search history.

(56) References Cited

U.S. PATENT DOCUMENTS

| | | | |
|---|---|---|---|
| 2005/0243936 A1* | 11/2005 | Agrawala | H04W 64/00 375/259 |
| 2008/0214360 A1 | 9/2008 | Stirling et al. | |
| 2014/0171107 A1* | 6/2014 | Kao | G01C 21/206 455/456.1 |
| 2015/0312719 A1* | 10/2015 | Cho | G01S 5/0263 455/456.5 |
| 2016/0061614 A1 | 3/2016 | Lee et al. | |

OTHER PUBLICATIONS

Kalman Filter [online] [retrieved Jan. 23, 2020] . Retrieved from the Internet: https://web.archive.org/web/20190930114346/https://en.wikipedia.org/wiki/kalman_filter (Sep. 30, 2019) 33 pages.

* cited by examiner

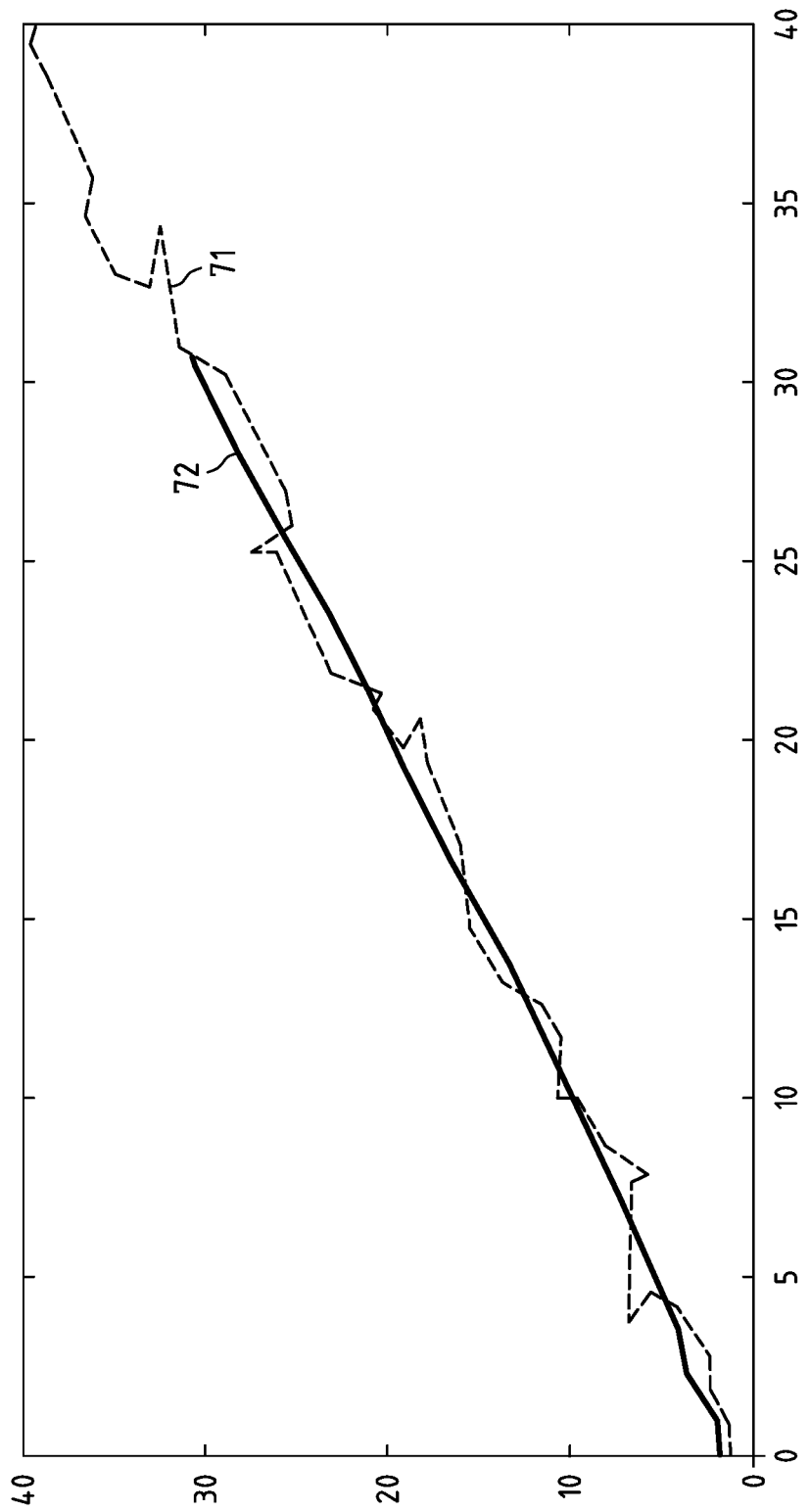

USING MOTION STATE OF MOBILE DEVICE FOR POSITION ESTIMATE

CROSS-REFERENCE TO RELATED APPLICATIONS

This application claims priority to European Application No. 18200485.3, filed Oct. 15, 2018, the entire contents of which are incorporated herein by reference.

FIELD OF THE DISCLOSURE

The invention relates to the field of positioning such as the positioning of mobile devices observing radio signals of radio nodes, specifically in the framework of online positioning where the positioning of the mobile device is at least in part performed by a server.

BACKGROUND

Modern global cellular (e.g. wireless cellular telecommunication system) and non-cellular (e.g. WLAN) positioning technologies are based on collecting large global databases containing information on the cellular and non-cellular signals. A large portion of this data typically originates from the users of these positioning technologies (naturally with their consent).

The data from the users is typically collected in the form of fingerprints, each containing a location estimate (e.g. a GNSS-based or WLAN-based location estimate) and the respective measurement taken from the respective radio interface (e.g. the respective cellular or non-cellular interface). Typically, the measurement data then gets uploaded to the server or cloud, where algorithms are run to generate models of respective wireless communication nodes for positioning purposes based on the fingerprints received from the multitude of users. Such models may for instance be coverage areas, node positions, radio propagation models, Rx fields or the like. Independent of the specific implementation, the resulting data is generally referred to as radiomaps or radiomap data. This stage is usually referred to as "collecting stage" or "training stage".

These models (or a part thereof) may then either be used at the server for determining position estimates of a mobile device or transferred back to the respective mobile device for further use in position determination thereof, again by utilizing respective radio measurements in the surrounding of the mobile device, the positioning "stage".

Usually, the operating systems (OS) of the mobile devices offer open APIs (e.g. Location Framework, Sensor API, Location API etc.) to access the radio and location measurements both for the collecting and for the actual positioning stage. This means that the application developer does not have a direct access to the low-level hardware interfaces, which usually are chipset vendor proprietary and hence not standardized over the industry. Instead, the radio and location data are provided in the OS-specific format with the built-in access rights specific to the APIs. Unfortunately, the open APIs typically do not have reliable mechanism for the application developer to verify the APIs are securely reading the measurement data from the low-level HW drivers and/or whether the APIs are not processing/filtering the measurement data in a malicious way. Thus, other ways of ensuring the reliability and improving the accuracy of positioning estimates based on such measurement data need to be found.

It shall be noted that although the mobile device may have e.g. GNSS-capability, the end user can still benefit from using cellular/non-cellular positioning technologies in terms of time-to-first-fix and power consumption. Also, not all applications require highly accurate GNSS-based position (e.g. for local weather application it suffices to use cell-based location estimate). Also, cellular/non-cellular positioning technologies work indoors, which is generally a challenging environment for GNSS-based technologies.

As described above, the actual positioning process can basically function in two modes. The first mode is the "terminal-assisted mode" (also referred to as "online mode"), in which the mobile device performs the measurements of the cellular and/or non-cellular radio node signals, provides the measurements to the remote server, which in turn provides the position estimate back to the mobile device.

The second mode is the "terminal-based mode" (also referred to as "offline mode"), in which the mobile device has a local copy of the radiomap or, most likely, a subset of the global radiomap. This radiomap is downloaded by the mobile device from the remote server for the area of interest (e.g. a small area around the current location, for a whole country, or so). This subset can also be pre-installed to the device in the factory, but even in that case the data needs to be refreshed at some point.

Irrespective of the mode used, it is desirable to improve location accuracy and ensuring high reliability on the correctness of position estimates based on observed radio node signals. Specifically for the first case (online mode), it is desirable to achieve such aims without an excessive transmittal of data between the mobile device and the server.

SUMMARY OF SOME EMBODIMENTS OF THE INVENTION

Thus, it is inter alia an object of the present application to mitigate the above described drawbacks, i.e. to provide and improved location accuracy and to ensure a high reliability of the correctness of position estimates based on observed radio node signals without the need for an excessive transfer of data.

According to a first exemplary aspect of the invention, a method, performed by at least one apparatus, is disclosed, the method comprising:
  taking a plurality of radio measurements of radio node signals observable at a mobile device;
  obtaining motion measurement data indicative of motion of the mobile device;
  determining, based on the obtained motion measurement data, a motion state of the mobile device; and
  providing the plurality of radio measurements taken or information representative thereof and the determined motion state or information representative thereof.

The method may be referred to as the first method and the at least one apparatus may be referred to as the first apparatus. The method may in particular be performed and/or controlled by an apparatus according to the exemplary aspects of the invention, as described further below. The apparatus may in particular be the mobile device.

According to a second exemplary aspect of the invention, a method, performed by at least one apparatus, is disclosed, the method comprising:
  obtaining a plurality of radio measurements of radio node signals observable at a mobile device or information representative thereof;
  obtaining a motion state of the mobile device, the motion state having been determined based on motion measurement data indicative of motion of the mobile device, or information representative thereof; and determining a position estimate of the mobile device at least based on at least some of the obtained plurality of radio measurements or information representative thereof and the obtained motion state of the mobile device or the information representative thereof.

The method may be referred to as the second method and the at least one apparatus may be referred to as the second apparatus. The method may in particular be performed and/or controlled by an apparatus according to the exemplary aspects of the invention, as described further below. The apparatus may in particular be a server or cloud server.

According to a third exemplary aspect of the invention, a method, performed by a server and a mobile device, is disclosed, the method comprising:

taking, at the mobile device, a plurality of radio measurements of radio node signals observable at the mobile device;

obtaining, at the mobile device, motion measurement data indicative of motion of the mobile device;

determining, at the mobile device, based on the obtained motion measurement data, a motion state of the mobile device;

transmitting the plurality of radio measurements taken or information representative thereof and the determined motion state or information representative thereof from the mobile device to the server; and determining, at the server, a position estimate of the mobile device at least based on at least some of the obtained plurality of radio measurements or information representative thereof and the obtained motion state of the mobile device or the information representative thereof.

The mobile device and the server may in particular be examples of the first and second apparatus of the first and second method, respectively.

According to the different exemplary aspects of the invention an apparatus is disclosed, comprising means for performing a method according to a respective exemplary aspect of the invention. The means of the apparatus may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the apparatus may comprise various other components, like a communication interface, a network interface, a radio interface, a data interface, a user interface etc.

Thus, an exemplary apparatus according to any aspect may in particular comprise at least one processor and at least one memory including computer program code; the at least one memory and the computer program code configured to, with the at least one processor, cause the apparatus to at least perform a method according to a respective exemplary aspect of the invention.

The above-disclosed apparatuses according to any aspect of the invention may for instance be a module or a component for a device, for example a chip. Alternatively, the disclosed apparatus according to any aspect of the invention may be a device, for instance a mobile device or a server. The disclosed apparatus according to any aspect of the invention may comprise only the disclosed components, for instance respective means, a processor, a memory, or it may further comprise one or more additional components.

According to the third exemplary aspect of the invention, a system is disclosed, the system comprising a mobile device and a server and the system is configured to perform the method of the third exemplary aspect of the invention.

According to the different exemplary aspects of the invention, a computer program code is disclosed, the computer program code, when executed by a processor, causing an apparatus to perform a method according to the respective exemplary aspect of the invention.

The computer program may be stored on a computer-readable storage medium, in particular a tangible and/or non-transitory medium. The computer readable storage medium could for example be a disk or a memory or the like. The computer program could be stored in the computer readable storage medium (e.g. according to the exemplary aspect of the invention) in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to the different exemplary aspects of the invention, a (non-transitory) computer readable storage medium in which computer program code is stored, the computer program code causing at least one apparatus to perform when executed by a processor a method according to a respective exemplary aspect of the invention. The storage medium may be a tangible storage medium, for example a tangible computer-readable storage medium, e.g. as described above. The storage medium may be a storage medium of a mobile device, for example an apparatus according to the exemplary aspects of the invention.

In the following, exemplary features and exemplary embodiments of all aspects of the present invention will be described in further detail.

The method of the different exemplary aspects may be considered as methods for positioning a mobile device.

A plurality of radio measurements of radio node signals is understood to be e.g. at least two, three, four or more radio measurements. Therein, the radio measurements may be of the same type (i.e. emitted from the same type of radio nodes), but taken e.g. at different times, e.g. shortly after one another, as will be described in more detail below. A plurality of radio measurements of radio signals can provide information about the temporal development of the radio environment observable by the mobile device. Thus, not only a single instantaneous measurement is provided, but a series of a plurality of instantaneous radio measurements. While this may already allow analyzing outliers in order to better estimate the position and while this may already allow deriving respective position estimates (in combination with respective radio map data) and also the change of position over time (which may already improve a position estimate), information such as a motion state may however not be reliably derived from such radio measurements, as the individual resulting position estimates may be too jumpy and inaccurate due to different factors, such as measurement inaccuracies and noise.

A respective radio measurement may comprise different information comprised by or derivable from the respective radio node signals. A specific radio measurement may thus dependent on the radio node emitting the respective signal, in particular on whether the radio node is a cellular or non-cellular radio node. In any case, a radio measurement may at least comprise an identifier of the respective radio node observed or of radio signals emitted therefrom (radio node ID). However, it is preferred when a respective radio measurement comprises additional information, as explained below.

Examples of cellular radio nodes are radio nodes of a cellular communication system or network, such as a second generation (2G, for instance the Global System for Mobile Communication (GSM), the General Packet Radio System (GPRS), the Enhanced Data Rates for GSM Evolution (EDGE) or the High Speed Circuit-Switched Data (HSCSD)), third generation (3G, for instance the Universal Mobile Telecommunication System, UMTS, WCDMA, TD-SCDMA or CDMA-2000), fourth generation (4G, for instance the Long Term Evolution, LTE system, the LTE Advanced (LTE-A) system or the IEEE 802.16m WiMAX system) or fifth generation (5G) communication system or network.

Examples of non-cellular radio nodes are radio nodes of a non-cellular communication system or network, such as a WLAN (e.g. a WiFi or IEEE 802.11) system, a Bluetooth (LE) system, a ZigBee system, a radio-frequency identification (RFID) system, a broadcasting network such as for instance Digital Video Broadcasting (DVB), Digital Audio Broadcasting (DAB) or Frequency-Modulated (FM)/Amplitude-Modulated (AM) system, a Near Field Communication (NFC) system, etc.

Generally, a cellular communication system may for instance be characterized by a basically seamless pavement of a geographical area (usually in the order of at least hundreds or thousands of square kilometers) with cells in which coverage is provided by respective nodes of the communication system that are operated by the same operator, which network may for instance support communication handover between cells. Consequently, a non-cellular communication system may be characterized as a communication system that does not have all of these properties.

In more detail, specifically in case of a cellular radio node (i.e. a radio node of a cellular communication system or network), a respective radio measurement may contain
- a global and/or local identifier of the respective cellular radio node or cell observed,
- a signal strength estimate,
- a pathloss estimate, and/or
- a timing measurement (such as Timing Advance or Round-Trip Time).

In case of a non-cellular radio node (i.e. a radio node of a non-cellular communication system or network), a respective radio measurement may contain
- a global or local identifier of the respective non-cellular radio node (e.g. the BSSIDs, typically the MAC address of the air interface of a respective WiFi access points observed and/or the SSIDs),
- a signal strength estimate (e.g. received signal strength index, physical Rx level in dBm ref 1 mW, etc.),
- a pathloss estimate, and/or
- a timing measurement (e.g. Round-Trip Time).

In addition to the plurality of radio measurements, motion measurement data indicative of motion of the mobile device is obtained. Such motion measurement data is preferably obtained from one or more motion sensors of the mobile device. The motion measurement data may for instance be raw measurement data of respective sensors. The motion measurement data may be obtained (e.g. measured) at the same time or substantially the same time at which the plurality of radio measurements are taken.

Based on this motion measurement data, a motion state of the mobile device is determined. Thus, in the described approach the additional motion measurement data is not or not only used directly for recreating a specific (geographical) position of the mobile device or as a measure for the position itself, but the motion measurement data is now (additionally or solely) used for determining the motion state of the mobile device. Therein the motion state may also be considered to be a motion state estimate, as it may not be completely certain in which motion state the mobile device (and thus e.g. the user carrying the mobile device) is. Examples of a motion state are "stationary", "slow motion", "fast motion", etc. Specifically, the motion state may even indicate certain probabilities for different motion state, as will be explained in more detail below.

Both, the plurality of radio measurements taken and the determined motion state or information representative thereof can then be provided, e.g. wirelessly over a network, to another apparatus such as a remote server.

Accordingly, the plurality of radio measurements of radio node signals observable at a mobile device and the motion state of the mobile device (or respective information representative thereof) can then obtained at another apparatus, e.g. a (cloud) server.

At least some of the plurality of radio measurements (e.g. in combination with a respective radiomap of the area, in which the mobile device observes the radio node signals), may then be associable with a respective (e.g. geographical) position of the mobile device. Thus, a plurality of positions of the mobile device may be determined from (at least some of) the plurality of radio measurements. The plurality of positions may be used by a respective algorithm in order to obtain a (final) position estimate of the mobile device, which will be explained in more detail below.

For instance, in one approach the obtained radio measurements may be used to retrieve respective location information of the radio nodes observed by the mobile device (which radio nodes may be identified by their identifier) from a positioning database. The radio node location information may then be fused in order to estimate the position of the mobile device. However, this approach may vary depending on the radio measurements taken and the radiomap data available.

A determining of a position estimate of the mobile device may then not only be based on at least some of the obtained plurality of radio measurements, but also on the obtained motion state of the mobile device.

The described approach has the advantage that a position estimate determined based on the plurality of radio measurements can be improved as the motion state of the device taking the radio measurements can be understood. While such a motion state may also be estimated based on the plurality of radio measurements itself, this may have the drawback of leading to erroneous detections of the motion state. For example, the radio measurement-based positioning estimate is often relatively "jumpy" even when the mobile device is stationary (i.e. the radio measurement-based positioning estimate provides different positions if the measurement is repeated even though the mobile device is actually not moving). As a result a radio measurement-based estimation of the motion state might erroneously detect e.g. a motion state indicating "slow motion" instead of "stationary".

Additionally, the approach of first estimating the motion state based on the motion measurement data and then (only) providing the motion state (without having to provide the actual motion measurement data) allows that the motion state is estimated in the mobile device itself. This can be advantageous because many devices already contain motion sensors such as inertial measurement sensors, allowing a motion state determination far more reliable than e.g. the radio measurement-based estimation. Furthermore, the size of the raw data of motion measurement data produced by the respective motion sensors is usually too large to be sent efficiently from the mobile device to the server. Thus, the approach of having the first apparatus (e.g. mobile device) itself reporting its motion state to the second apparatus (e.g. server) is particularly advantageous.

The described approach therefore provides an advantageous mechanism for providing the motion state (e.g. from a mobile device to a server), and to use the motion state in the position estimation.

The communication between a first apparatus (e.g. a client or mobile device) and a second apparatus (e.g. server) as described herein, that is specifically the providing and obtaining of the plurality of radio measurements taken and of the determined motion state (or respective information representative thereof) may in particular utilize a positioning protocol. Such a positioning protocol may be understood to be a protocol with one or more of the following properties:

- The protocol supports the positioning in the online or terminal-assisted mode.
- The protocol supports sending radio measurements (such as taken from WiFi or Bluetooth radio nodes) from the first apparatus (typically the client such as the mobile device) to the second apparatus (typically the server or cloud server).
- The protocol supports sending a position estimate (for instance latitude, longitude, and/or altitude/floor) from the second apparatus (e.g. server) back to the first apparatus (e.g. client), once the second apparatus has estimated the position of the mobile device.
- The position protocol may also support the option for the first apparatus (client) to send not only one, but a plurality (e.g. a time series) of radio measurements to the second apparatus (server) to improve the location accuracy.

According to an exemplary embodiment of the different aspects of the invention, the plurality of radio measurements comprises a chronological series of radio measurements. For instance, the plurality of radio measurements may be taken over a time of (at least or at most) 2 seconds, 5 seconds 10 seconds or 30 seconds. For instance, a radio measurement may be taken (at least or at most) every second, every 2 seconds or every 5 seconds. For instance the radio measurements may be consecutive radio measurements. For instance, the plurality of radio measurements may be radio measurements taken within a predetermined period.

According to an exemplary embodiment of the different aspects of the invention, the motion state is determined independently of the plurality of radio measurements. As already explained, while a plurality of radio measurements of radio node signals may generally allow to determine the change of a position of a mobile device observing respective radio node signals over time, the individual resulting position estimates may be too jumpy and inaccurate to allow a reliable determination of a motion state, for instance. Thus, the motion state is determined solely on information different from the plurality of radio measurements. Accordingly, the obtained motion measurement data indicative of motion of the mobile device is also different and independent of the plurality of the radio measurements.

According to an exemplary embodiment of the different aspects of the invention, the determining of the motion state of the mobile device is based on a motion sensor of the mobile device, in particular an inertial sensor, e.g. a gyroscope or an accelerometer. A motion sensor may provide motion measurement data suitable for determining a motion state of the mobile device without relying on radio measurements of radio node signals. Each of the embodiments has the advantage that respective motion sensors may be readily available in a variety of (end user) mobile devices, such as smartphones. Since the motion state determined based on motion measurement data is provided by the first apparatus and obtained by the second apparatus, it is not necessary to transfer the actual motion measurement data obtained from these sensors (i.e. the raw motion measurement data) from the first to the second apparatus.

According to an exemplary embodiment of the different aspects of the invention, the determining of the motion state of the mobile device comprises utilizing a step frequency and/or a vibrational frequency content. This provides an efficient approach (particularly for a mobile device) for deriving the motion sate from the available motion measurement data. Both, a step frequency and a vibrational frequency content may efficiently and reliably be derived or extracted from the motion measurement data indicative of motion of the mobile device. A step frequency (of the user of the mobile device) may allow for determining whether the user of the mobile device is standing, walking or running, e.g. because the step frequency is above and/or below a predefined threshold. A vibrational content may allow for determining if the user of the mobile device is in/on a specific transport vehicle (e.g. a car) due to an identified vibrational content specific to the transport vehicle.

According to an exemplary embodiment of the different aspects of the invention, the motion state indicates at least one motion type chosen from a plurality of motion types, each motion type being associated with a specific degree of motion. For instance, the motion state may indicate precisely one motion type (e.g. the motion type determined to be present most likely). Already given examples of motion types are "stationary", "slow motion" or "fast motion". For instance, the first apparatus may specify the motion state for the second apparatus by either explicitly writing out the motion state (e.g. as being "stationary", "slow motion" etc.) or by using a coding scheme, e.g. an integer, for instance (e.g. "1" being stationary, "2" being slow motion etc.).

According to an exemplary embodiment of the different aspects of the invention, the motion state indicates a combination of at least two motion types. This may further improve the accuracy of a position estimate and may in particular be useful in case the motion state cannot be sufficiently clearly determined. For instance, the motion state may be a linear combination or superposition of different motion types. For instance, the motion state may indicate a probability for at least two motion types, e.g. for all motion types or only for those motions type which are considered to be present with a certain probability According to an exemplary embodiment of the different aspects of the invention, the motion state indicates at least one motion type of the following motion types:
 stationary;
 slow motion;
 fast motion;
 walking;
 running;
 cycling; and/or
 driving.

In each case a motion type is associated with a specific degree of motion. The degree of motion for "stationary" is less than the degree of motion for "slow motion", which is again less than the degree for "fast motion". Typically, the degree of motion for "walking" is less than the degree of motion for "running", which is again less than the degree for "cycling", which is again less than the degree for "driving". As already explained, there may be the option to provide more than one motion type as the motion state, preferably also indicating respective probabilities, such as 60% chance of "walking" and 40% chance of "running".

According to an exemplary embodiment of the different aspects of the invention, the method further comprises:
  obtaining a position estimate of the mobile device, the position estimate having been determined at least based on at least some of the plurality of radio measurements or information representative thereof and the motion state of the mobile device or information representative thereof.

The position estimate may be received from the second apparatus (e.g. from a server), such as in the online or terminal-assisted mode. This has the advantage that the first apparatus (e.g. the mobile device itself) does not need to determine its position and does thus not need to have respective (up-to-date) radiomap data available, for instance. Nevertheless, the motion measurement data obtained at the mobile device can still improve the position estimate as the motion state determined by the first apparatus based on the motion measurement data is provided to the second apparatus.

Nevertheless, it is also possible that the position estimate is determined by the first apparatus itself (e.g. the mobile device), such as in the offline or terminal-based mode. Also in this case, it may still be advantageous to determine a motion state based on motion measurement data even if the motion state does not need to be transferred to another apparatus, as the motion state may still provide an efficient way of influencing the determination of the position estimate and utilizing the motion measurement data for improving the position estimate.

An exemplary algorithm for determining the position estimate will be described in more detail below.

According to an exemplary embodiment of the different aspects of the invention, the radio node signals are signals emitted by cellular or non-cellular radio nodes. As already mentioned, examples of cellular radio nodes are inter alia a GSM, WCDMA, TD-SCDMA, LTE, LTE-A, CDMA, NB-IoT or 5G radio node. As also mentioned, examples of non-cellular radio nodes are inter alia a WLAN, a Bluetooth, a Bluetooth LE or a ZigBee radio node. In each of these cases of a position estimate based on radio measurements of respective radio node signals, the positioning accuracy may be improved with the approach described herein.

According to an exemplary embodiment of the different aspects of the invention, the determining of a position estimate of the mobile device is performed by a positioning algorithm and the positioning algorithm takes into account the motion state of the mobile device. For instance, the motion state may be an input (e.g. input parameter) to the positioning algorithm or the motion state may influence an input of the positioning algorithm. The positioning algorithm is preferably performed by the second apparatus (e.g. the server), so that the first apparatus (e.g. the mobile device) does not need to hold available up-to-date radiomap data. As explained, the motion measurement data obtained at the first apparatus still improves the position estimate as the motion state determined by the first apparatus based on the motion measurement data can be efficiently provided to the second apparatus due to the smaller size compared to the raw data containing the motion measurement data.

According to an exemplary embodiment of the different aspects of the invention, at least one parameter of the positioning algorithm for determining the position estimate of the mobile device is influenced by the motion state of the mobile device. The motion state may influence only a single parameter or more than one parameter of the positioning algorithm. The parameter may be an input parameter of the algorithm. The parameter may be a scalar, a vector or a matrix, for instance. The value of the parameter may be determined based on the motion state, e.g. predefined or calculated based on the motion state. The value to be used for the parameter for a specific motion state may be found empirically.

According to an exemplary embodiment of the different aspects of the invention, the at least one parameter is or comprises at least one of
  a noise parameter of the positioning algorithm;
  a variability parameter of the positioning algorithm;
  a covariance parameter of the positioning algorithm; and/or
  a parameter of the positioning algorithm indicating a covariance of a noise.

It has been found that the motion state can be taken into account effectively by the positioning algorithm by influencing a parameter indicating or representing a noise and/or variability (in particular a covariance). Each of the embodiments allows the motion state to be taken into account in an efficient manner in the positioning algorithm for improving the position estimate. Each of the parameters may anyhow be provided as input parameters of the algorithm. Thus, this approach has the additional advantage that the positioning algorithm may not need to be changed or adapted, but an already available parameter may be used for taking into account the motion state.

Specifically in case of a Kalman filter (as explained further below), the parameter of the positioning algorithm may indicate the covariance of the process noise. Generally, the respective parameter may be set such that the higher the degree of motion indicated by the motion parameter, the higher the respective parameter (i.e. the higher the noise and/or the variability).

According to an exemplary embodiment of the different aspects of the invention, the method comprises:
  setting the at least one parameter utilized by the positioning algorithm for determining the position estimate of the mobile device to a respective first value, in case the motion state corresponds to a first motion type,
  setting the at least one parameter utilized by the positioning algorithm for determining the position estimate of the mobile device to a respective second value, in case the motion state corresponds to a second motion type indicating more movement than the first motion type, and optionally
  setting the at least one parameter utilized by the positioning algorithm for determining the position estimate of the mobile device to a respective third value, in case the motion state corresponds to a third motion type indicating more movement than the second motion type.

The algorithm thus provides at least two, preferably at least three different values for the respective parameter subject to the motion state. For instance, the second value of the parameter may at least in part be larger than the first value of the parameter. For instance, the third value of parameter may at least in part be larger than the second value. As explained above, the at least one parameter may in particular be a variability parameter (specifically the covariance of the process noise).

According to an exemplary embodiment of the different aspects of the invention, the motion state influences a degree of filtering, dampening, smoothing and/or averaging applied by the positioning algorithm for determining the position estimate of the mobile device. The result of the position estimate may be improved by adapting the degree of filtering, dampening, smoothing and/or averaging applied by the positioning algorithm on positions. Therein, the filtering, dampening and/or averaging is understood to be a filtering, dampening, smoothing and/or averaging applied to respective positions derived from (at least some of) the plurality of the radio measurements. Generally, the influence of the motion state in the algorithm is provided such that the lower the degree of motion indicated by the motion state the higher the degree of filtering, dampening, smoothing and/or averaging and such that the higher the degree of motion indicated by the motion state the lower the degree of filtering, dampening, smoothing and/or averaging.

According to an exemplary embodiment of the different aspects of the invention, the determining of a position estimate of the mobile device employs a filtering or smoothing algorithm, in particular a Kalman filter or smoother or a variant thereof. A filtering or smoothing algorithm may advantageously already provide input parameters which may effectively be adjusted based on the motion state.

For instance, the Kalman filter assumes that the true state at time k is evolved from the state at (k−1) according to $$x_k = F_k x_{k-1} + B_k u_k + w_k,$$

where
$F_k$ is the state transition model which is applied to the previous state $x_{k-1}$;
$B_k$ is the control-input model which is applied to the control vector $u_k$;
$w_k$ is the process noise which is assumed to be drawn from a zero mean multivariate normal distribution N with covariance $Q_k$.

Thus, in case of the Kalman filter, the covariance of the process noise (denoted $Q_k$ according to above notation) may be set based on the motion state. A predefined $Q_k$ may be provided for each of a plurality of motion types, e.g. $Q_k^{stationary}$, $Q_k^{walk}$, $Q_k^{run}$ etc. As already mentioned above, it is generally possible that the motion state does not only indicate a single motion type but that it also indicates a more than one motion type, e.g. different motion types with respective probabilities. In that case the parameter $Q_k$ may be set as a linear combination of the respective $Q_k$'s of the different motion types, which may further be weighted with the respective probability that the motion type is present, if available. Thus, as an example if 60% probability of walking and 40% probability of running is determined, the covariance of the process noise may take the form of $Q_k = 0.6^2 * Q_k^{walk} + 0.4^2 * Q_k^{run}$.

According to an exemplary embodiment of the different aspects of the invention, the apparatus is or comprises:
a mobile device;
a module for a mobile device;
a server; or
a module for a server.

Specifically, the first apparatus performing the first method may be a mobile device or a module thereof (typically acting as a client) and the second apparatus performing the second method may be a server or a module thereof.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

The following description serves to deepen the understanding of the present invention and shall be understood to complement and be read together with the description as provided in the above summary section of this specification.

Figure 1:
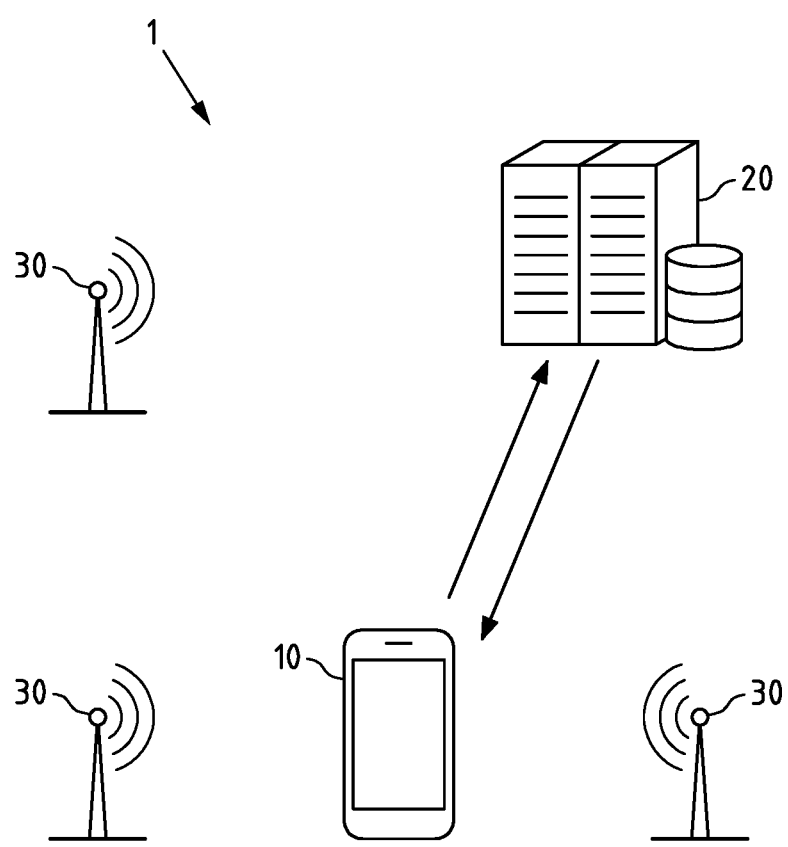
FIG. 1 is a diagram of a system according to an exemplary embodiment of the invention.

FIG. 1 is a diagram of a system 1 comprising a mobile device 10, in this case a smart phone, which is an example embodiment of a first apparatus, and a server 20, which is an example embodiment of a second apparatus. The mobile device 10 may alternatively be realized by a personal digital assistant, a laptop computer, a tablet computer or a wearable, for instance. Also schematically illustrated in FIG. 1 are radio nodes 30, e.g. WiFi access points, in the environment of the mobile device 10.

The apparatuses 10 and 20 may separately or together perform exemplary embodiments of the different methods according to the invention. Further details of mobile device 10 and server 20 are described in the following with respect to FIGS. 2 and 3, respectively, which are exemplary block diagrams of the respective apparatuses.

While the invention will be exemplarily described particularly with respect to a mobile device 10 as a first apparatus and a server 20 as a second apparatus, the following explanations are also applicable to other examples of apparatuses.

Figure 2:
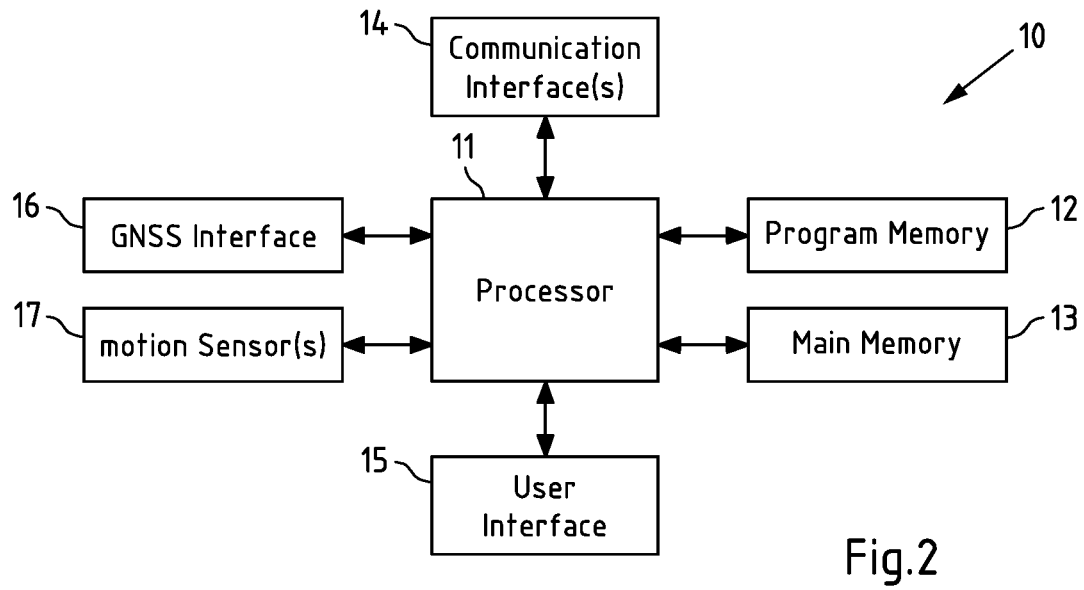
FIG. 2 is a block diagram of the mobile device of FIG. 1 as an example of an apparatus according to the first aspect of the invention.

Turning now to FIG. 2, an exemplary block diagram of a mobile device, such as mobile device 10 of FIG. 1 is shown.

Mobile device 10 comprises a processor 11. Processor 11 may represent a single processor or two or more processors, which are for instance at least partially coupled, for instance via a bus. Processor 11 may use program memory 12 and main memory 13 to execute a program code stored in program memory 12 (for instance program code causing mobile device 10 to perform embodiments of the first method, when executed on processor 11).

Processor 11 further controls a communication interface 14 configured to receive and/or send information. For instance, the mobile device 10 may be configured to at least obtain radio measurements of radio node signals of radio nodes 30 observable by mobile device 10 and to exchange information with server 20 of FIG. 1. Specifically, mobile device 10m is able to provide a plurality of radio measurements taken (or information representative thereof) and a determined motion state of mobile device 10 (or information representative thereof) to server 20. Also, the mobile device 10 is able to receive a position estimate of the mobile device 10 from server 20.

The described communication may for instance be based on a (e.g. partly) wireless connection. The communication interface 14 may thus comprise circuitry such as modulators, filters, mixers, switches and/or one or more antennas to allow transmission and/or reception of signals. For instance, communication interface 14 is at least configured to allow communication according to a non-cellular and/or cellular communication system, such as for instance according to a WLAN network and/or according to a 2G/3G/4G and/or 5G cellular communication system.

Processor 11 further controls a user interface 15 configured to present information to a user of mobile device 10 and/or to receive information from such a user, such as manually input position fixes or the like. User interface 14 may for instance be the standard user interface via which a user of mobile device 10 controls other functionality thereof, such as making phone calls, browsing the Internet, etc.

Processor 11 may further control a GNSS interface 16 configured to receive positioning information of an GNSS such as Global Positioning System (GPS), Galileo, Global Navigation Satellite System (i.e. "Globalnaja Nawigazionnaja Sputnikowaja Sistema", GLONASS) or Quasi-Zenith Satellite System (QZSS).

Processor 11 may further control one or more motion sensor(s) 17, which allow obtaining motion measurement data indicative of motion of the mobile device. The motion sensor(s) 17 may be or comprise inertial sensor(s), such as an accelerometer and/or a gyroscope.

The components 12-17 of mobile device 10 may for instance be connected with processor 11 by means of one or more serial and/or parallel busses.

Figure 3:
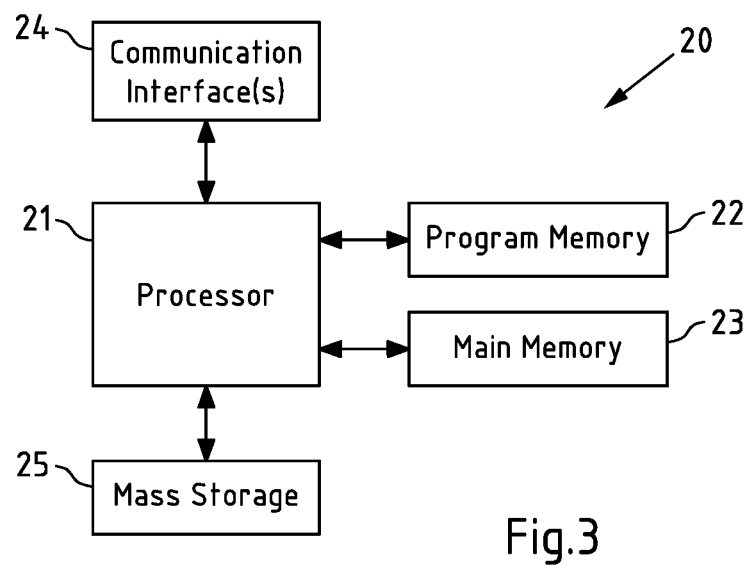
FIG. 3 is a block diagram of the server of FIG. 1 as an example of an apparatus according to the second aspect of the invention.

Turning now to FIG. 3, an exemplary block diagram of a server 20 of FIG. 1 is shown. Server 20 comprises a processor 21. Processor 21 may represent a single processor or two or more processors, which are for instance at least partially coupled, for instance via a bus. Processor 21 may use program memory 22 and main memory 23 to execute a program code stored in program memory 22 (for instance program code causing server 20 to perform embodiments of the first method, when executed on processor 21). Some or all of memories 22 and 23 may also be included into processor 21. One of or both of memories 22 and 23 may be fixedly connected to processor 21 or at least partially removable from processor 21. Program memory 22 may for instance be a non-volatile memory. It may for instance be a FLASH memory, any of a ROM, PROM, EPROM and EEPROM memory or a hard disc, to name but a few examples. Program memory 22 may also comprise an operating system for processor 21. Main memory 23 may for instance be a volatile memory. It may for instance be a RAM or DRAM memory, to give but a few non-limiting examples. It may for instance be used as a working memory for processor 21 when executing an operating system and/or programs.

Processor 21 further controls one or more communication interfaces 24 configured to receive and/or send information. For instance, server 20 may be configured to communicate with mobile device 10 of system 1 of FIG. 1. Such a communication may for instance comprise receiving a plurality of radio measurements taken (or information representative thereof) and a determined motion state of mobile device 10 (or information representative thereof) from mobile device 10. Also, server 20 is able to send a position estimate of the mobile device to the mobile device 10. The communication may for instance be based on a (e.g. partly) wireless connection. The communication interface 24 may thus comprise circuitry such as modulators, filters, mixers, switches and/or one or more antennas to allow transmission and/or reception of signals. In embodiments of the invention, communication interface 24 is inter alia configured to allow communication according to a 2G/3G/4G/5G cellular communication system and/or a non-cellular communication system, such as for instance a WLAN network.

Processor 21 further interfaces with a mass storage 25, which may be part of the server 20 or remote from server 20, and which may for instance be used to store one or more databases. For instance, server 20 may store, in a database, collected information from crowd sourcing processes. The database may for instance store collected radio fingerprints of radio signals from radio nodes (such as radio nodes 30) measured by mobile devices (such as mobile device 10 or dedicated collecting devices) at different locations. The collected radio fingerprint data can be used to assemble respective radiomap data.

The components 22-25 of server 20 may for instance be connected with processor 21 by means of one or more serial and/or parallel busses.

The methods of the different aspects will now be described in more detail with respect to FIG. 4 to 8.

Figure 4:
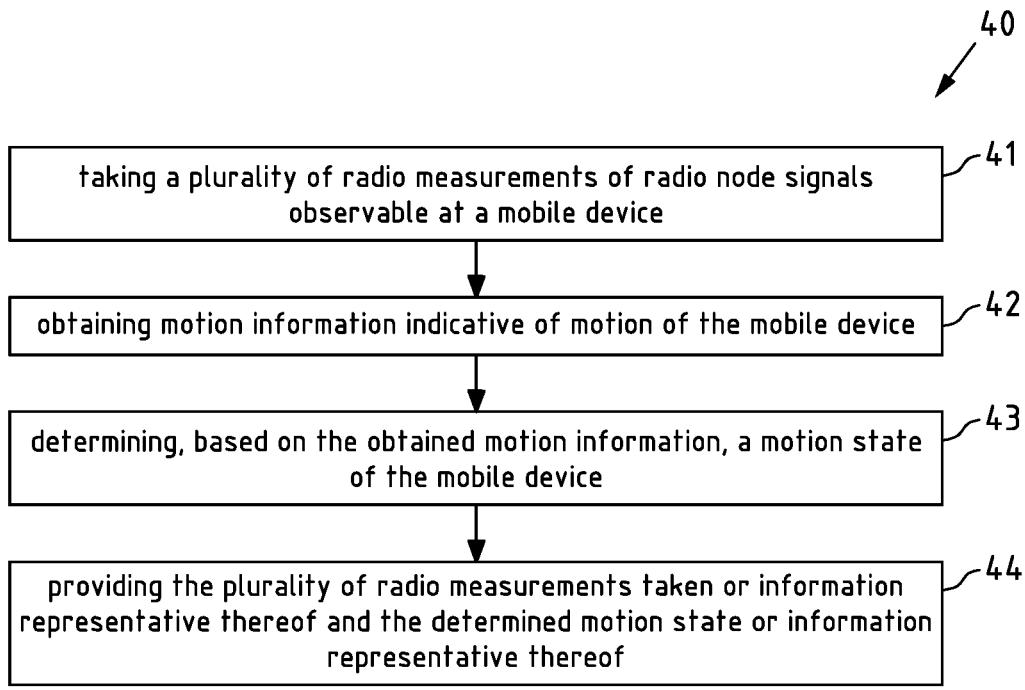
FIG. 4 is a flow chart illustrating an example of a method according to the first aspect.
Figure 5:
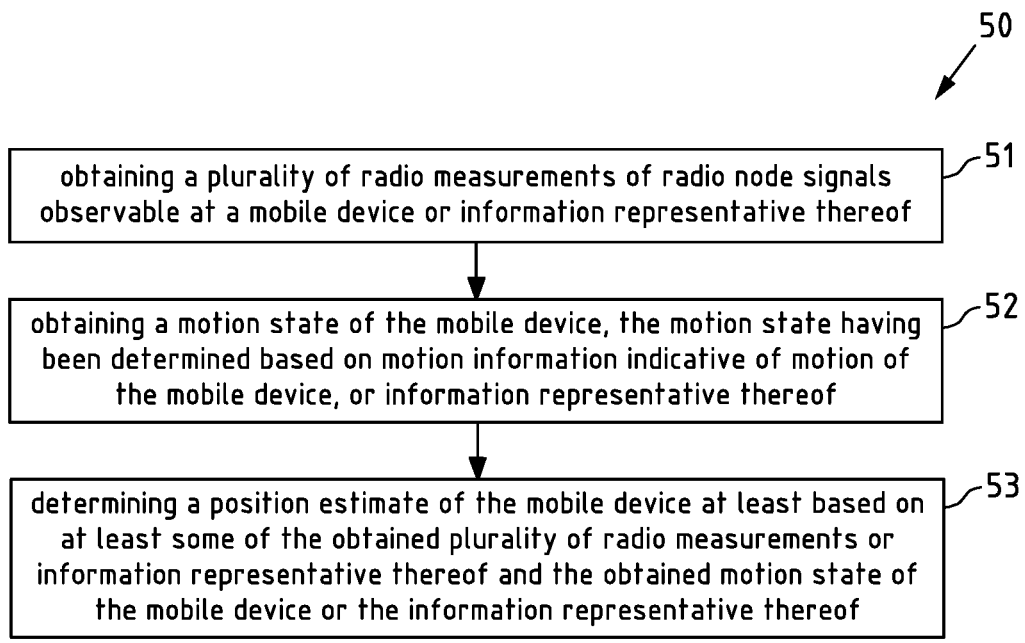
FIG. 5 is a flow chart illustrating an example of a method according to the second aspect.
Figure 6:
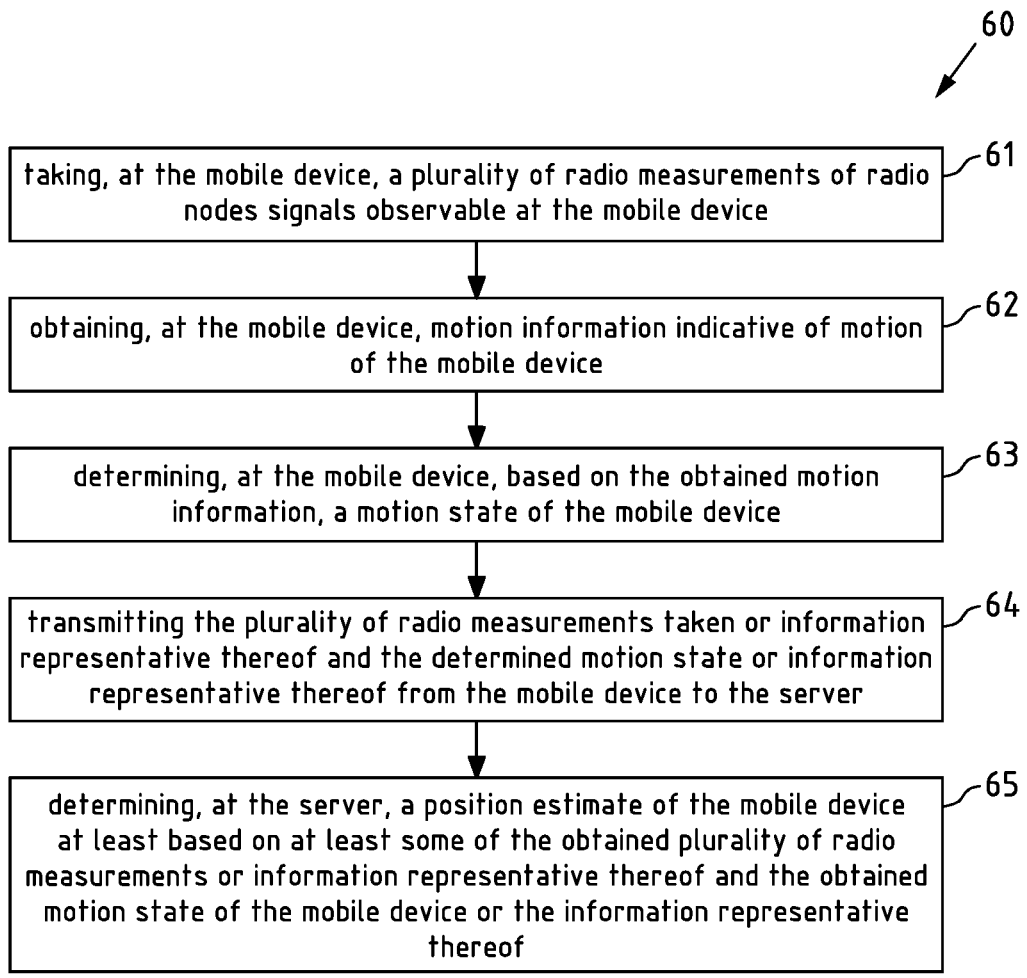
FIG. 6 is a flow chart illustrating an example of a method according to the third aspect.
Figure 7A:
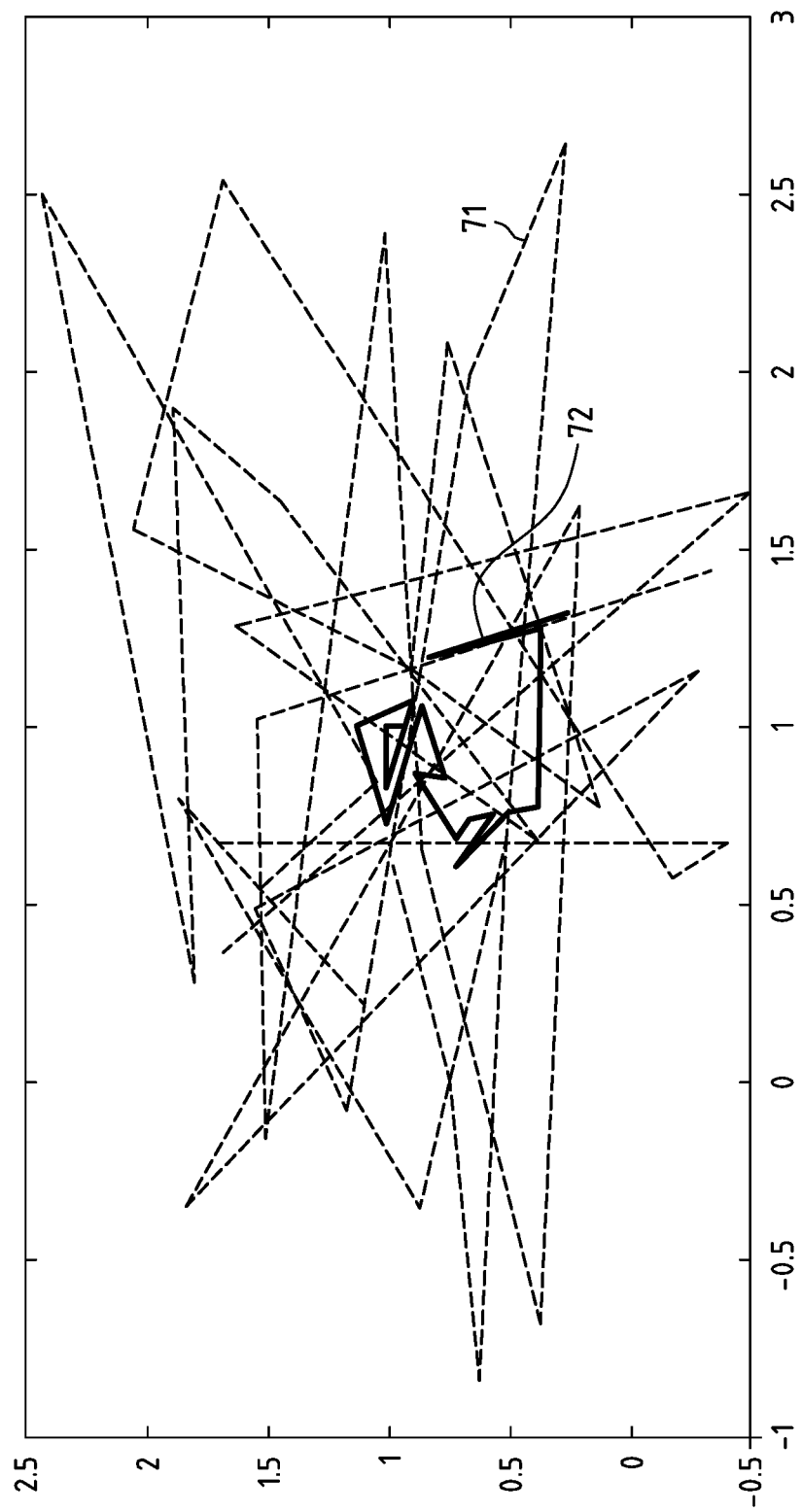
FIG. 7a)-i) different diagrams illustrating the impact on position estimates when assuming different motion states.
Figure 7B:
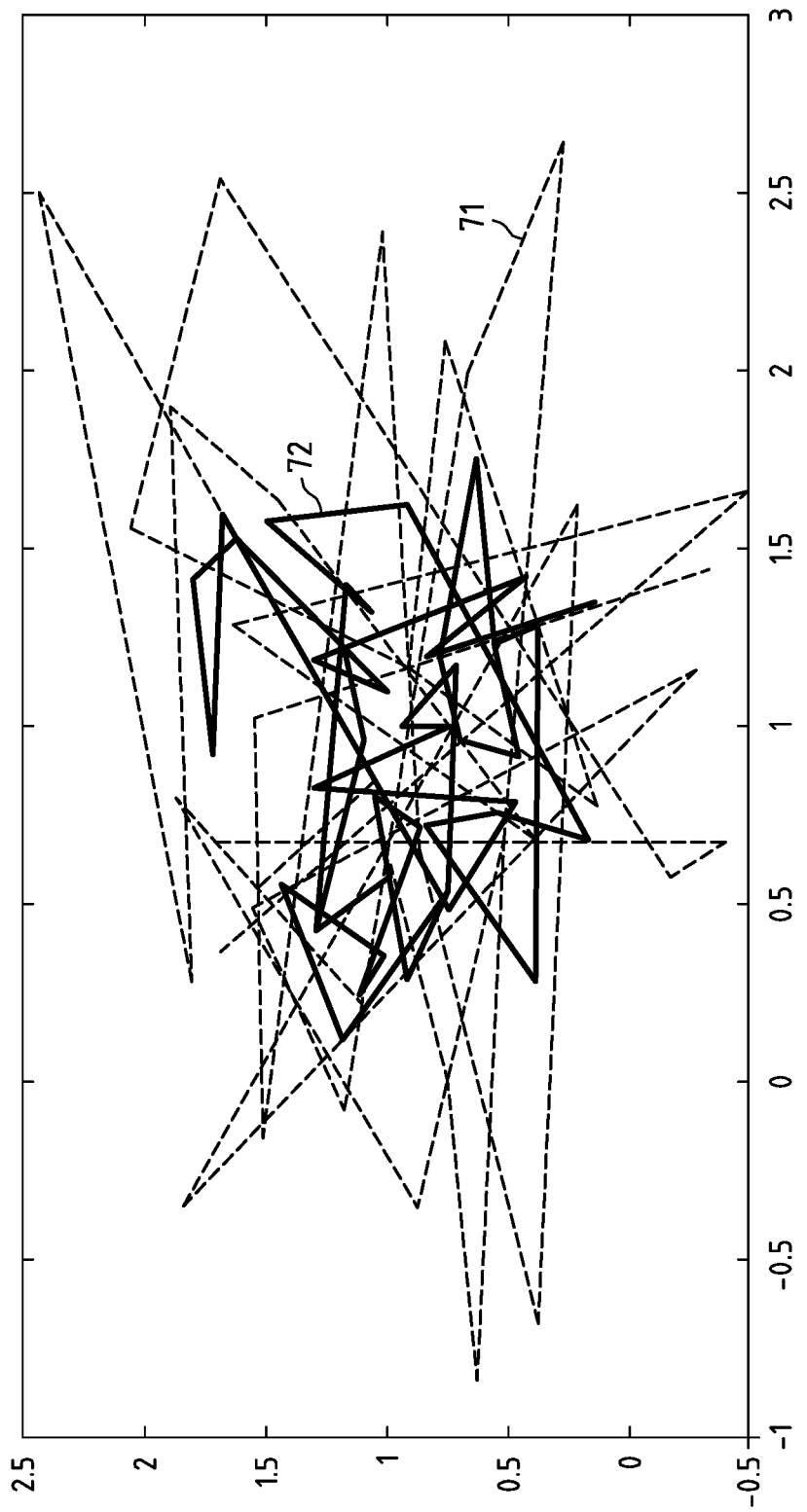
Figure 7C:
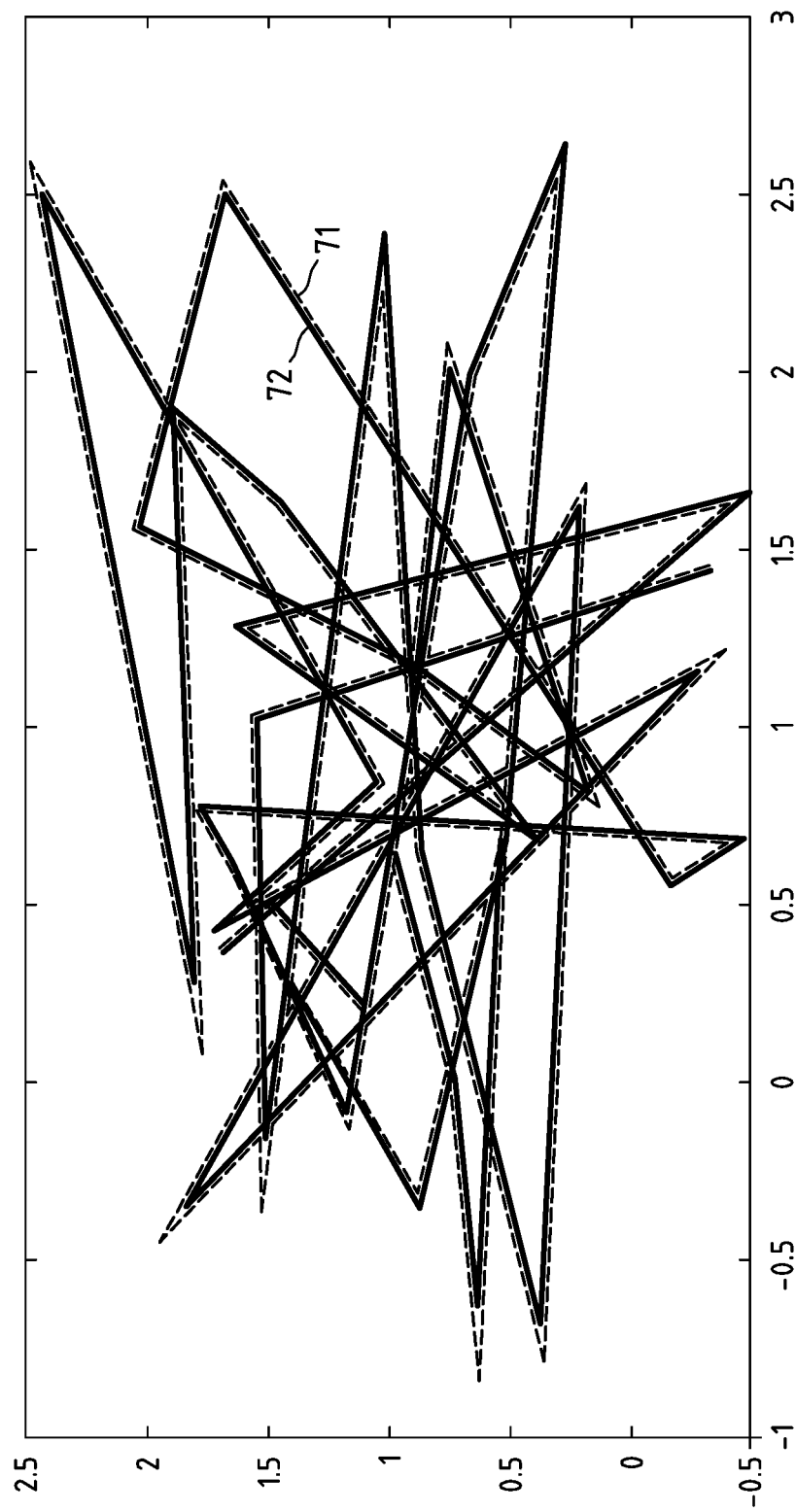
Figure 7E:
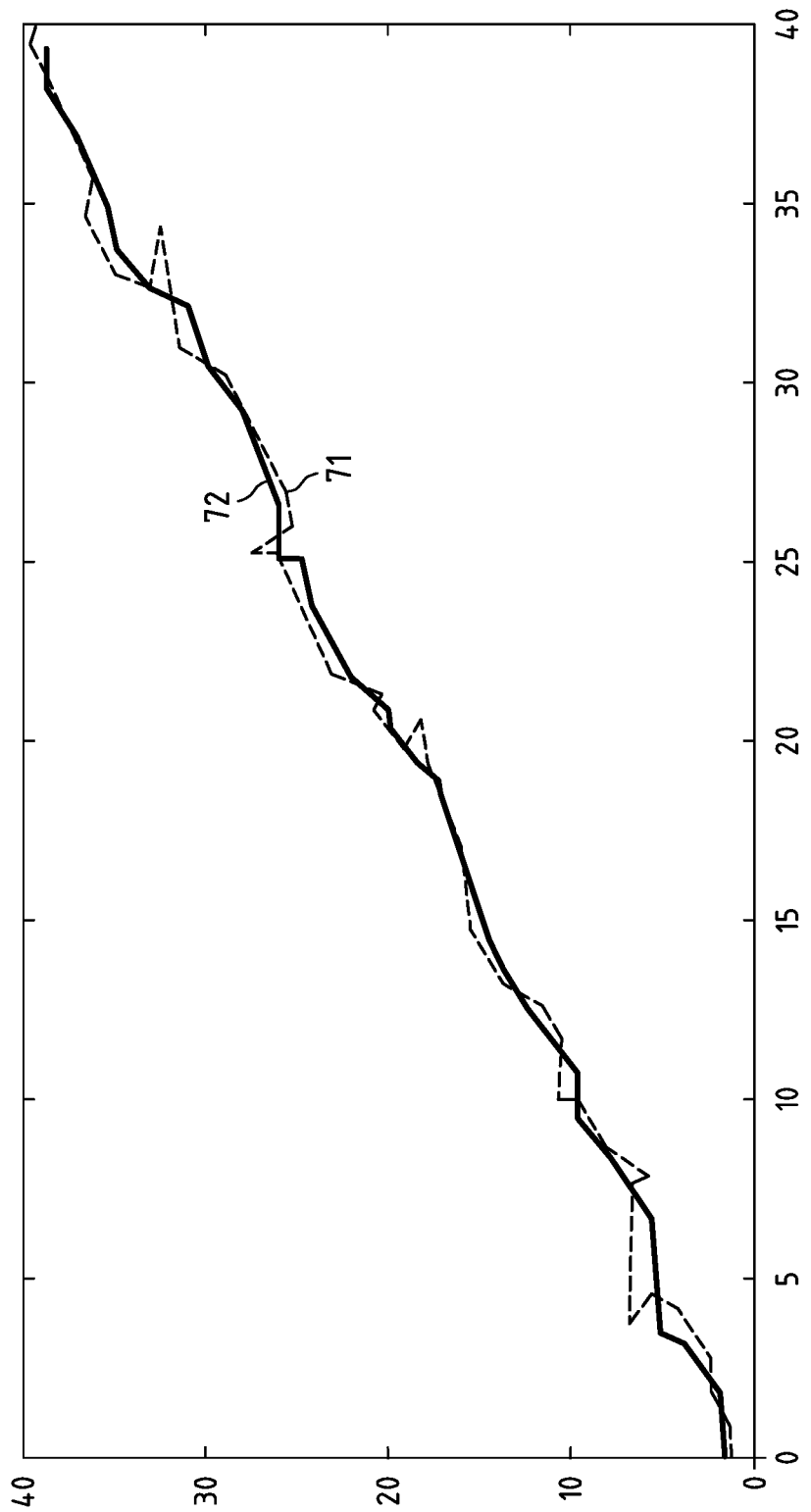
Figure 7F:
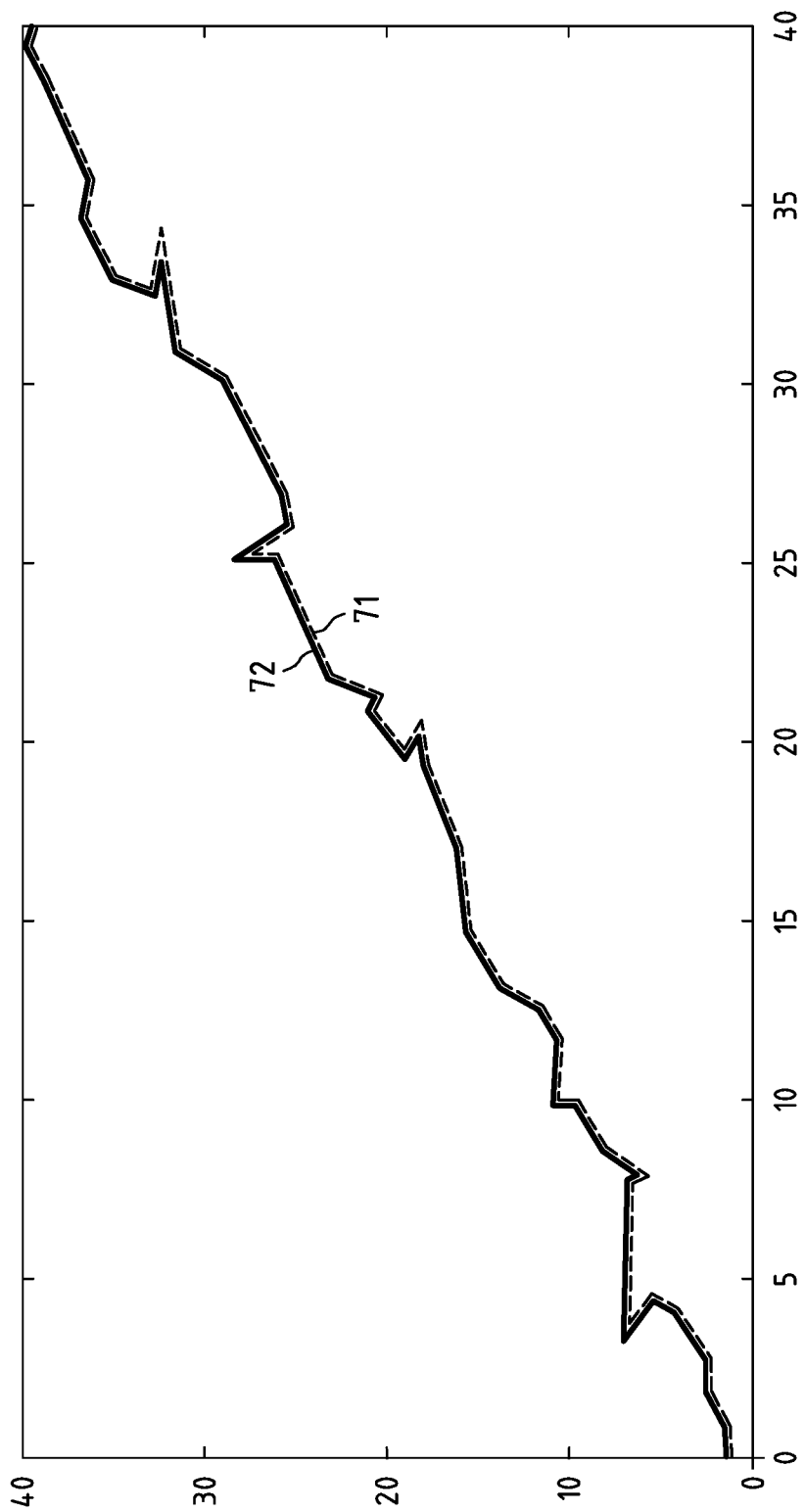
Figure 7G:
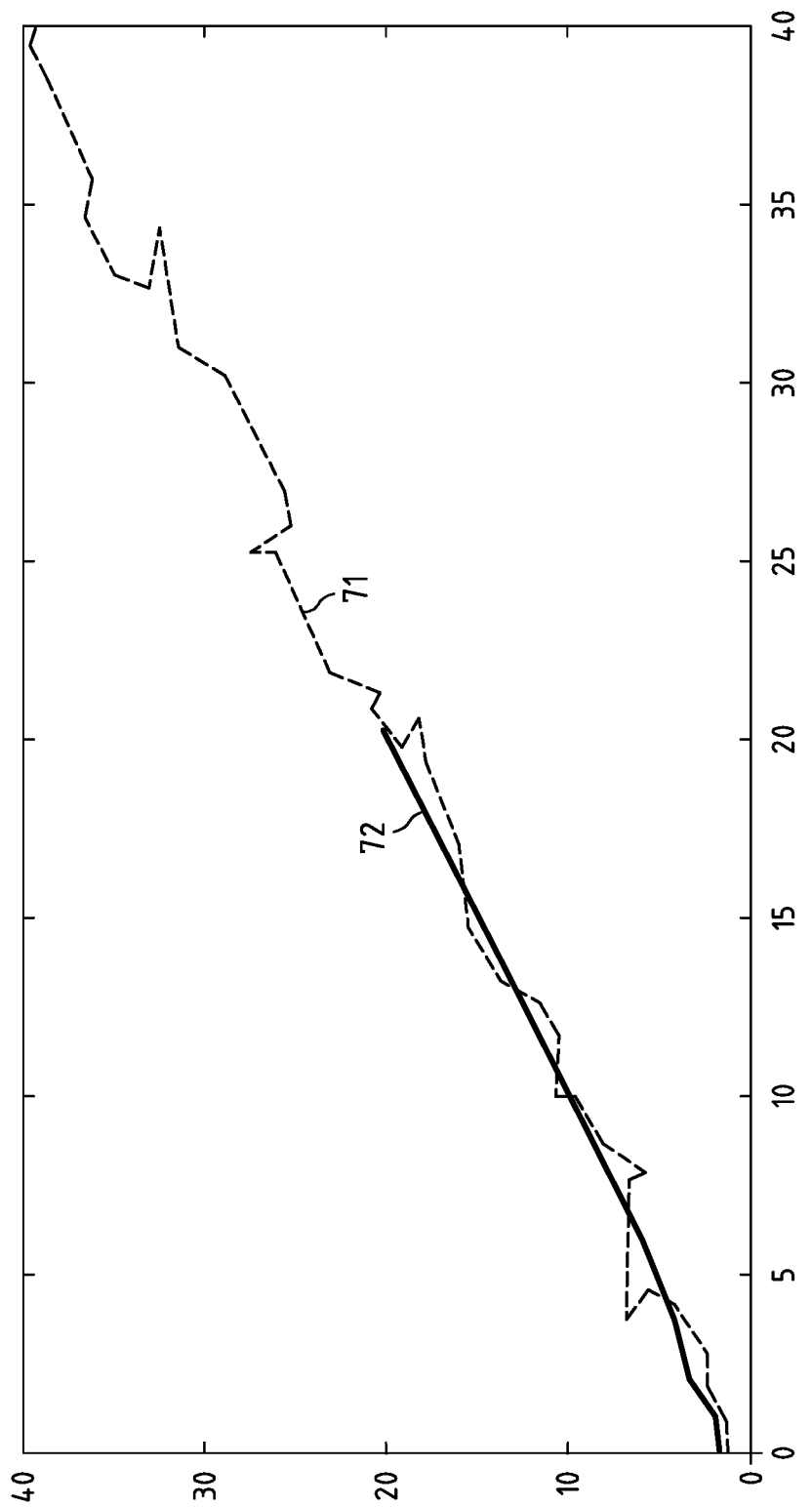
Figure 7H:
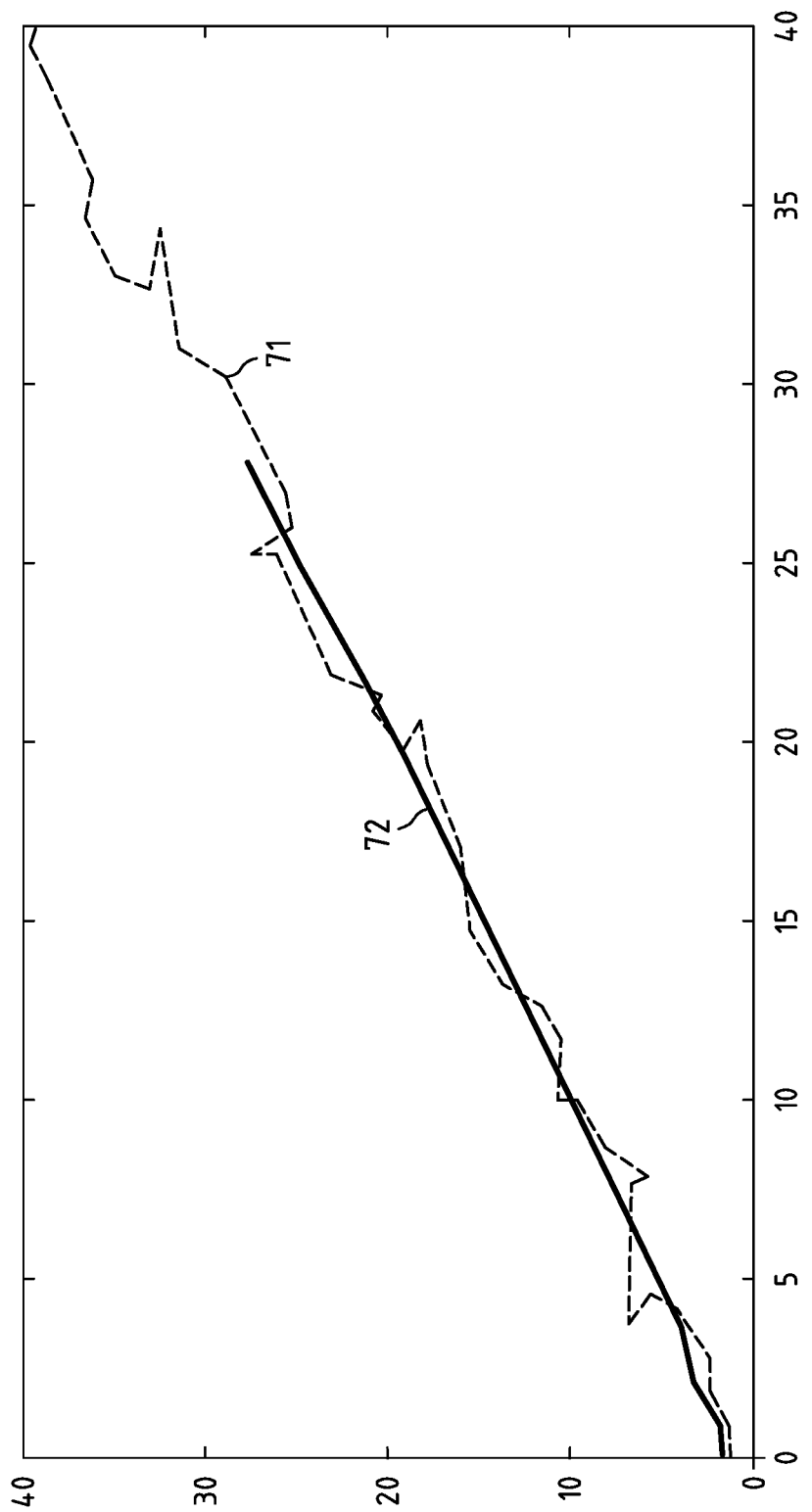
Figure 7I:
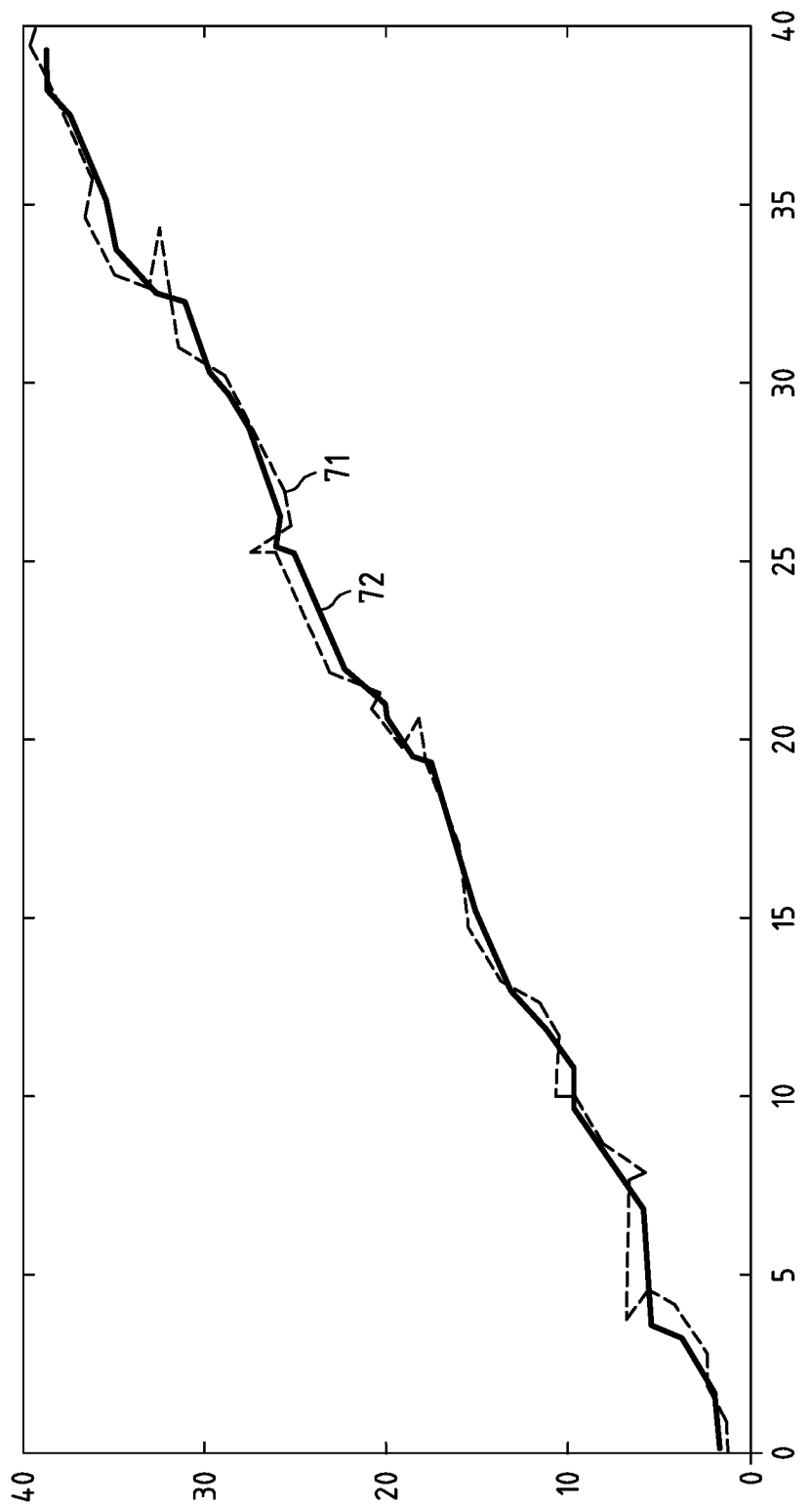

FIG. 4 is a flow chart 40 illustrating an example of a method according to the first aspect. FIG. 5 is a flow chart 50 illustrating an example of a method according to the second aspect. FIG. 6 is a flow chart 60 illustrating an example of a method according to the third aspect.

A plurality of radio measurements of radio node signals observable at a mobile device 10 are taken (actions 41, 61). Also, motion measurement data (such as motion sensor data) indicative of motion of the mobile device 10 is obtained (actions 42, 62). Based on the obtained motion measurement data, a motion state of the mobile device 10 is determined (actions 43, 63). This action is performed locally at the mobile device 10, so that the (comparably large) motion measurement data data does not need to be transferred to server 20.

A preferred approach to motion state estimation is to utilize inertial sensors (accelerometer or gyroscope). For instance, the accelerometer-based step frequency can be used to distinguish between running and walking. Moreover, the frequency content of the vibration provides clues on the type of motion e.g. cycling, car, etc. Typically, the amount of the raw data produced by such inertial sensors is so large that data cannot be efficiently transferred from mobile device 10 to the server 20. Therefore, the data needs to be compressed by estimating the motion state in the mobile device 10 and reporting only the motion state to the server 20.

The motion state may be carried e.g. as an enumeration {stationary, walk, run, cycle, car} in the used protocol.

The plurality of radio measurements taken (or information representative thereof) and the determined motion state (or information representative thereof) is then sent to server 20 (actions 44, 64).

Server 20 obtains the plurality of radio measurements of radio node signals observable at the mobile device 10 (or information representative thereof). Server 20 also obtains the motion state of the mobile device 10 (or information representative thereof), the motion state having been determined based on motion measurement data indicative of motion of the mobile device 10 (actions 51, 52, 64).

Based on at least some of the obtained plurality of radio measurements (or information representative thereof) and the obtained motion state of the mobile device (or the information representative thereof) server 20 determines a position estimate of the mobile device 10 (action 53, 65).

Figure 8:
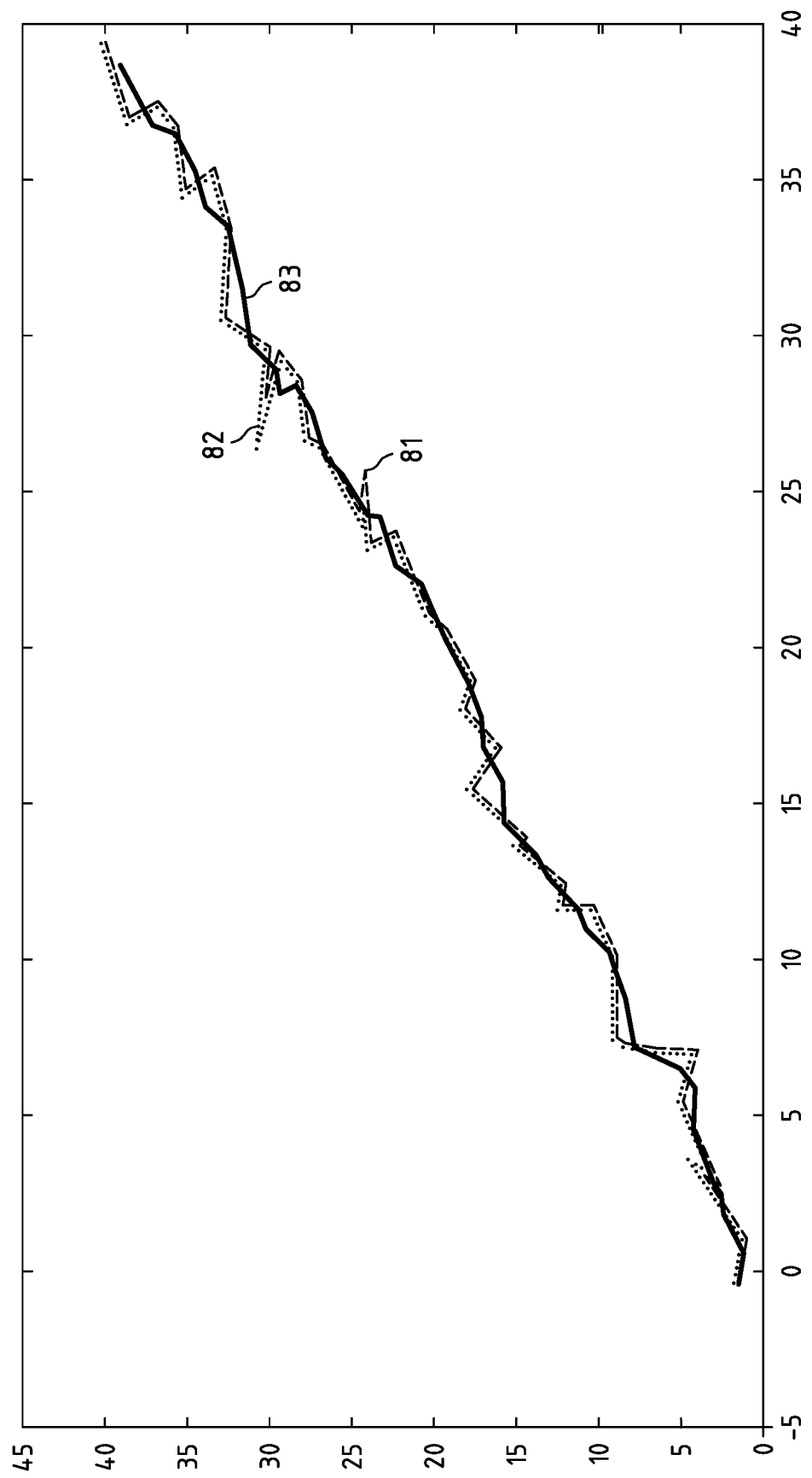
FIG. 8 a further diagram illustrating the impact on position estimates when assuming two different motion states.

The advantage of taking the (correct) motion state into account when determining a positon estimate is illustrated in FIG. 7 and FIG. 8. FIG. 7 shows diagrams illustrating the impact on position estimates when assuming different motion states. FIG. 8 shows a further diagram illustrating the impact on position estimates when assuming different motion states.

FIG. 7 shows the impact of knowing a-priori the motion state of the mobile device 10. The impact is illustrated for combinations of three different exemplary true and assumed motion states: "stationary", "walking" and "running".

For FIG. 7 a), b), c) the true motion state of the mobile device 10 corresponds to the "stationary" case, for FIG. 7 d), e), f) the true motion state of the mobile device 10 corresponds to "walking" and for FIG. 7 g), h), i) the true motion state of the mobile device 10 corresponds to "running". Independently of the true motion state of the mobile device 10, the algorithm has to assume a motion state of the mobile device 10 and a parameter of the positioning algorithm may be set accordingly. For FIG. 7 a), d), g) the assumed motion state of the mobile device 10 corresponds to the "stationary" case, for FIG. 7 b), e), h) the assumed motion state of the mobile device 10 corresponds to "walking" and for FIG. 7 c), f), i) the assumed motion state of the mobile device 10 corresponds to "running". Accordingly, for FIG. 7a, 7e, 7i) the motion state is assumed correctly i.e. known a-priori.

In each figure the x and y axes represent distance units, e.g. meters. In each case, the dotted line 71 in the background denotes the single-shot location estimates based on the instantaneous radio measurements. Thus, all the noise in the radio measurements get reflected in the location estimates undamped. The solid line 72, in contrast, is the filtered path determined by the positioning algorithm with respective different values of the assumed motion state parameter, as explained above.

In the case depicted in FIG. 7 a), i.e. the mobile device 10 is "stationary", and the positioning algorithm is run with a parameter value also corresponding to "stationary", the algorithm averages the location very nicely. The resulting course of position estimates 72 is a better assumption of the actually stationary mobile device 10 than the position estimates 71.

However, if the mobile device 10 is actually stationary, but the positioning algorithm is run with parameter values that assume motion (like "walking" or "running"), the advantageous averaging effect diminishes, FIG. 7 b), and finally the filtering has no effect whatsoever, FIG. 7 c), and the measuring noise is not damped.

When the user of the mobile device is walking or running, but the positioning algorithm is run with the parameter values related to lesser motion ("stationary" and "stationary"/"walk", respectively) the position lags significantly as shown in FIGS. 7 d), 7g) and 7 h). Accordingly, the positioning performance (i.e. accuracy) is poor.

Now, when the motion state parameter values match with the actual motion of the mobile device, the performance (i.e. the accuracy) is improved, as shown in FIG. 7 a), e), i).

FIG. 8 illustrates the cases shown in FIG. 7 e), f) in more detail and the significance of selecting the right value for the motion parameter. Again, the observed path distorted by noise is shown as the dotted line 81 (position estimates derived from instantaneous radio measurements). Now, if the motion parameter value in the positioning algorithm is selected for "running", the algorithm does not or not sufficiently reduce the noise and the solid path 82 follows the noisy doted path and the positioning performance is poor. However, when the motion parameter value is correctly set to "walking", the positioning algorithm appropriately reduces noise and smoothes the path of position estimates as shown by the dashed path 83, which is closer reflects the true positions of the mobile device 10.

One option to implement the positioning algorithm and to estimate positions using a time series of radio measurements as explained above is to use a Kalman Filter (or one of its variants). In that case, the parameter used by the algorithm that can be influenced by or that corresponds to the "motion state" is the "covariance of the process noise" $Q_k$. The numerical value of $Q_k$ can be varied based on the motion state. Therein, qualitatively low noise corresponds to slow motion and high noise to fast motion. The actual numerical values for a respective parameter for the various motion states are typically found out by trial-and-error.

It is noted, that it is possible to provide the option of providing multiple motion types (in particular with the respective probabilities) as a motion state, e.g. "walking" 60%, "running" 40%. This shall be interpreted so that the mobile device 10 is unsure, whether the user is walking or running, but walking is still more probable. In such a case the process noise covariance to be used can be a combination of those for "walking" and "running", e.g. $0.6^2 * Q_k^{walk} + 0.4^2 Q_k^{run}$.

Figure 9:
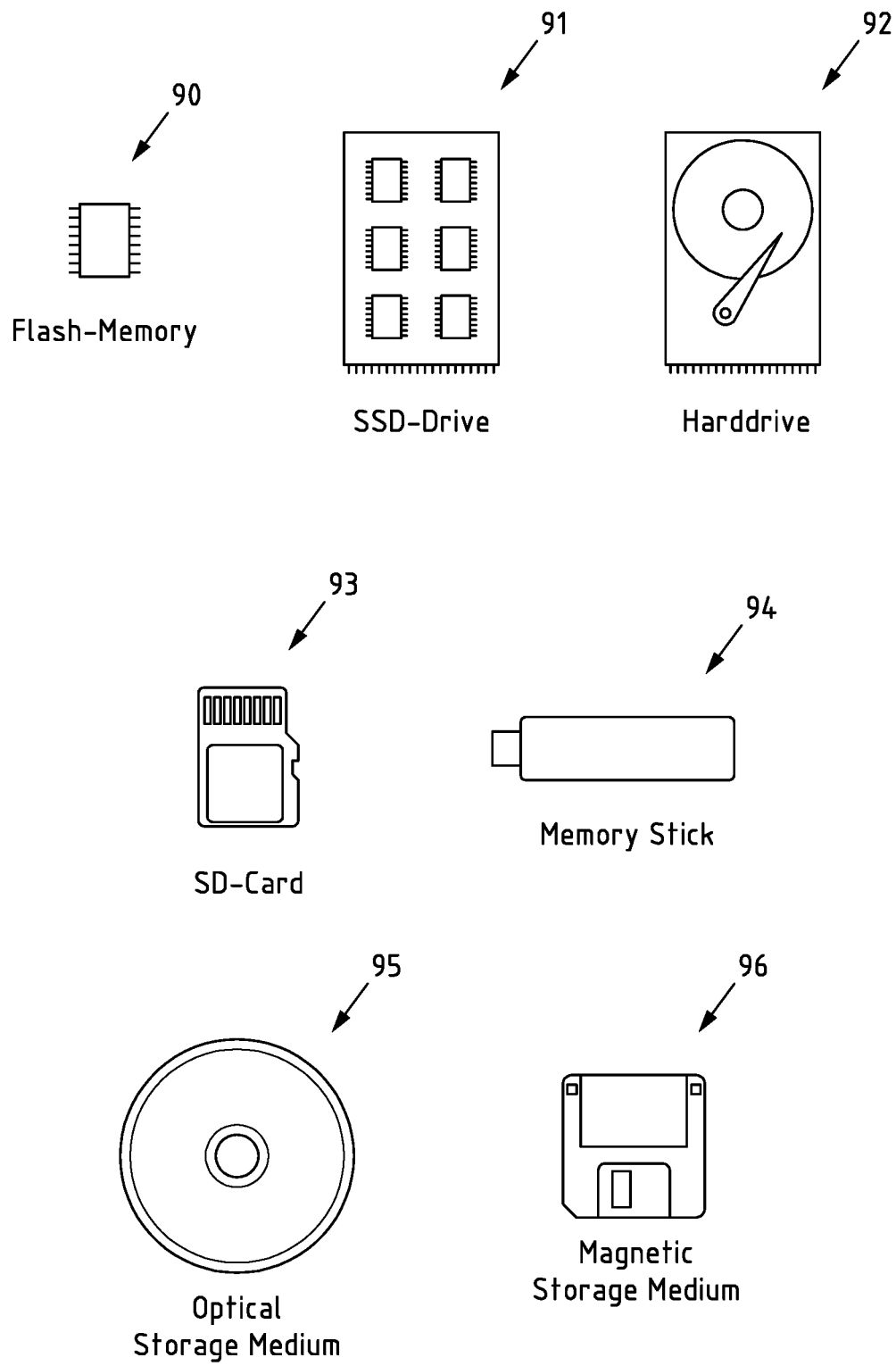
FIG. 9 is a schematic illustration of examples of tangible storage media according to the invention.

FIG. 9 is a schematic illustration of examples of tangible storage media according to the present invention, that may for instance be used to implement program memory 12 of FIG. 2 and/or program memory 22 of FIG. 3. To this end, FIG. 9 displays a flash memory 90, which may for instance be soldered or bonded to a printed circuit board, a solid-state drive 91 comprising a plurality of memory chips (e.g. Flash memory chips), a magnetic hard drive 92, a Secure Digital (SD) card 93, a Universal Serial Bus (USB) memory stick 94, an optical storage medium 95 (such as for instance a CD-ROM or DVD) and a magnetic storage medium 96.

The following embodiments are also disclosed:

1. Method performed by at least one apparatus, the method comprising:
    taking a plurality of radio measurements of radio node signals observable at a mobile device;
    obtaining motion measurement data indicative of motion of the mobile device;
    determining, based on the obtained motion measurement data, a motion state of the mobile device; and providing the plurality of radio measurements taken or information representative thereof and the determined motion state or information representative thereof.
2. Method of embodiment 1, wherein the plurality of radio measurements comprises a chronological series of radio measurements.
3. Method of embodiment 1 or 2, wherein the motion state is determined independently of the plurality of radio measurements.
4. Method of any of the preceding embodiments, wherein the determining of the motion state of the mobile device is based on a motion sensor of the mobile device, in particular an inertial sensor, e.g. a gyroscope or an accelerometer.
5. Method of any of the preceding embodiments, wherein the determining of the motion state of the mobile device comprises utilizing a step frequency and/or a vibrational frequency content.
6. Method of any of the preceding embodiments, wherein the motion state indicates at least one motion type chosen from a plurality of motion types, each motion type being associated with a specific degree of motion.
7. Method of claim 6, wherein the motion state indicates a combination of at least two motion types.
8. Method of any of the preceding embodiments, wherein the motion state indicates at least one motion type of the following motion types:
stationary;
slow motion;
fast motion;
walking;
running;
cycling; and/or
driving.
9. Method of any of the preceding embodiments, the method further comprising:
obtaining a position estimate of the mobile device, the position estimate having been determined at least based on at least some of the plurality of radio measurements and the motion state of the mobile device.
10. Method of any of the preceding embodiments, wherein the radio node signals are signals emitted by cellular or non-cellular radio nodes.
11. Method performed by at least one apparatus, the method comprising:
obtaining a plurality of radio measurements of radio node signals observable at a mobile device;
obtaining a motion state of the mobile device, the motion state having been determined based on motion measurement data indicative of motion of the mobile device, or information representative thereof; and
determining a position estimate of the mobile device at least based on at least some of the obtained plurality of radio measurements and the obtained motion state of the mobile device or the information representative thereof.
12. Method of embodiment 11, wherein the determining of a position estimate of the mobile device is performed by a positioning algorithm and the positioning algorithm takes into account the motion state of the mobile device.
13. Method of embodiment 12, wherein at least one parameter of the positioning algorithm for determining the position estimate of the mobile device is influenced by the motion state of the mobile device.
14. Method of embodiment 13, wherein the at least one parameter is or comprises at least one of
a noise parameter of the positioning algorithm;
a variability parameter of the positioning algorithm;
a covariance parameter of the positioning algorithm; and/or
a parameter of the positioning algorithm indicating a covariance of a noise.
15. Method of any of embodiments 13 to 14, wherein the method comprises:
setting the at least one parameter utilized by the positioning algorithm for determining the position estimate of the mobile device to a respective first value, in case the motion state corresponds to a first motion type,
setting the at least one parameter utilized by the positioning algorithm for determining the position estimate of the mobile device to a respective second value, in case the motion state corresponds to a second motion type indicating more movement than the first motion type, and optionally
setting the at least one parameter utilized by the positioning algorithm for determining the position estimate of the mobile device to a respective third value, in case the motion state corresponds to a third motion type indicating more movement than the second motion type.
16. Method of any of embodiments 12 to 15, wherein the motion state influences a degree of filtering, dampening, smoothing and/or averaging applied by the positioning algorithm for determining the position estimate of the mobile device.
17. Method of any of claims 11 to 16, wherein the determining of a position estimate of the mobile device employs a filtering or smoothing algorithm, in particular a Kalman filter or smoother or a variant thereof.
18. Method performed by a server and a mobile device, the method comprising:
taking, at the mobile device, a plurality of radio measurements of radio node signals observable at the mobile device;
obtaining, at the mobile device, motion measurement data indicative of motion of the mobile device;
determining, at the mobile device, based on the obtained motion measurement data, a motion state of the mobile device;
transmitting the plurality of radio measurements taken or information representative thereof and the determined motion state or information representative thereof from the mobile device to the server; and
determining, at the server, a position estimate of the mobile device at least based on at least some of the obtained plurality of radio measurements or information representative thereof and the obtained motion state of the mobile device or information representative thereof.
19. An apparatus comprising means for performing a method according to any of the embodiments 1 to 18.
20. The apparatus according to embodiment 19, wherein the apparatus is or comprises:
a mobile device;
a module for a mobile device;
a server; or
a module for a server.
21. A system comprising a mobile device and a server, the system configured to perform the method of embodiment 18.
22. A computer program code, the computer program code, when executed by a processor, causing an apparatus to perform a method according to any of embodiments 1 to 18.

23. A computer readable storage medium in which computer program code is stored, the computer program code causing at least one apparatus to perform when executed by a processor a method according to any of embodiments 1 to 18.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors of FIGS. 2 and 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. Method performed by at least one apparatus, the method comprising:

taking a plurality of radio measurements of radio node signals observable at a mobile device;
obtaining motion measurement data indicative of motion of the mobile device;
determining, based on the obtained motion measurement data, a motion state of the mobile device, the motion state selected from a plurality of motion types, each of the plurality of motion types corresponding to a category of motion;
providing the plurality of radio measurements taken or information representative thereof and the determined motion state or information representative thereof; and
obtaining a position estimate of the mobile device, the position estimate having been determined at least based on at least some of the plurality of radio measurements or information representative thereof and the motion state of the mobile device or information representative thereof and at least one parameter set based at least on the motion state or information representative thereof, the at least one parameter comprising at least one of (a) a noise parameter of the positioning algorithm, (b) a variability parameter of the positioning algorithm, (c) a covariance parameter of the positioning algorithm, or (d) a parameter of the positioning algorithm indicating a covariance of a noise.

2. The method of claim 1, wherein the plurality of radio measurements comprises a chronological series of radio measurements.

3. The method of claim 1, wherein the motion state is determined independently of the plurality of radio measurements.

4. The method of claim 1, wherein the determining of the motion state of the mobile device is based on a motion sensor of the mobile device, in particular an inertial sensor, e.g. a gyroscope or an accelerometer.

5. The method of claim 1, wherein the determining of the motion state of the mobile device comprises utilizing a step frequency and/or a vibrational frequency content.

6. The method of claim 1, wherein the motion state indicates at least one motion type chosen from a plurality of motion types, each motion type being associated with a specific degree of motion.

7. The method of claim 6, wherein the motion state indicates a combination of at least two motion types.

8. The method of claim 1, wherein the motion state indicates at least one motion type of the following motion types: -stationary; -slow motion; -fast motion; -walking; -running; -cycling; and/or -driving.

9. A method performed by at least one apparatus, the method comprising:
obtaining (a) a plurality of radio measurements of radio node signals observable at a mobile device or (b) information representative of the plurality of radio measurements of radio node signals observable at the mobile device;
obtaining a motion state of the mobile device, the motion state comprising an indication of a motion type selected from a plurality of motion types based on (a) motion measurement data indicative of motion of the mobile device, or (b) information representative of motion of the mobile device, each of the plurality of motion types corresponding to a respective degree of motion;
setting at least one parameter for use in at least determining a position estimate of the mobile device, wherein the at least one parameter (i) is set based at least on the obtained motion state of the mobile device and (ii) is or comprises at least one of (a) a noise parameter of the positioning algorithm, (b) a variability parameter of the positioning algorithm, (c) a covariance parameter of the positioning algorithm, or (d) a parameter of the positioning algorithm indicating a covariance of a noise; and determining a position estimate of the mobile device at least based on (a) at least some of the obtained plurality of radio measurements or information representative of the plurality of radio measurements and (b) the at least one parameter.

10. The method of claim 9, wherein the determining of a position estimate of the mobile device is performed by a positioning algorithm and the positioning algorithm takes into account the motion state of the mobile device.

11. The method of claim 10, wherein the at least one parameter (a) is a parameter of the positioning algorithm for determining the position estimate of the mobile device and (b) is determined based at least in part on the motion state of the mobile device.

12. The method of claim 11, wherein the method comprises:

setting the at least one parameter utilized by the positioning algorithm for determining the position estimate of the mobile device to a respective first value, in case the motion state corresponds to a first motion type, and setting the at least one parameter utilized by the positioning algorithm for determining the position estimate of the mobile device to a respective second value, in case the motion state corresponds to a second motion type indicating more movement than the first motion type.

13. The method of claim 10, wherein a degree of filtering, dampening, smoothing and/or averaging applied by the positioning algorithm for determining the position estimate of the mobile device is determined based at least in part on the motion state.

14. The method of claim 9, wherein the determining of a position estimate of the mobile device employs a filtering or smoothing algorithm.

15. An apparatus comprising at least one processor and a memory for storing program code, wherein the at least one processor is configured to execute the program code to perform:

take a plurality of radio measurements of radio node signals observable at a mobile device;

obtain motion measurement data indicative of motion of the mobile device;

determine, based on the obtained motion measurement data, a motion state of the mobile device, wherein the motion state comprises a motion type selected from a plurality of motion types, each of the plurality of motion types corresponding to a category of motion;

provide the plurality of radio measurements taken or information representative thereof and the determined motion state or information representative thereof; and obtain a position estimate of the mobile device, the position estimate having been determined at least based on at least some of the plurality of radio measurements or information representative thereof and the motion state of the mobile device or information representative thereof and at least one parameter set based at least on the motion state or information representative thereof, the at least one parameter comprising at least one of (a) a noise parameter of the positioning algorithm, (b) a variability parameter of the positioning algorithm, (c) a covariance parameter of the positioning algorithm, or (d) a parameter of the positioning algorithm indicating a covariance of a noise.

16. The apparatus according to claim 15, wherein the apparatus is or comprises:
a mobile device;
a module for a mobile device;
a server; or
a module for a server.

17. An apparatus comprising at least one processor and a memory for storing program code, wherein the at least one processor is configured to execute the program code to perform:

obtain (a) a plurality of radio measurements of radio node signals observable at a mobile device or (b) information representative of the plurality of radio measurements of radio node signals observable at the mobile device;

obtain a motion state of the mobile device, the motion state comprising an indication of a motion type selected from a plurality of motion types based on (a) motion measurement data indicative of motion of the mobile device, or (b) information representative of motion of the mobile device, each of the plurality of motion types corresponding to a respective degree of motion;

set at least one parameter for use in at least determining a position estimate of the mobile device, wherein the at least one parameter (i) is set based at least on the obtained motion state of the mobile device and (ii) is or comprises at least one of (a) a noise parameter of the positioning algorithm, (b) a variability parameter of the positioning algorithm, (c) a covariance parameter of the positioning algorithm, or (d) a parameter of the positioning algorithm indicating a covariance of a noise; and determine a position estimate of the mobile device at least based on (a) at least some of the obtained plurality of radio measurements or information representative of the plurality of radio measurements and (b) the at least one parameter.

18. A computer readable storage medium in which computer program code is stored, the computer program code, when executed by a processor, causing an apparatus to perform the method according to claim 1.

19. A non-transitory computer readable storage medium in which computer program code is stored, the computer program code, when executed by a processor, causing an apparatus to obtain (a) a plurality of radio measurements of radio node signals observable at a mobile device or (b) information representative of the plurality of radio measurements of radio node signals observable at the mobile device;

obtain a motion state of the mobile device, the motion state comprising an indication of a motion type selected from a plurality of motion types based on (a) motion measurement data indicative of motion of the mobile device, or (b) information representative of motion of the mobile device, each of the plurality of motion types corresponding to a respective degree of motion;

set at least one parameter for use in at least determining a position estimate of the mobile device, wherein the at least one parameter (i) is set based at least on the obtained motion state of the mobile device and (ii) is or comprises at least one of (a) a noise parameter of the positioning algorithm, (b) a variability parameter of the positioning algorithm, (c) a covariance parameter of the positioning algorithm, or (d) a parameter of the positioning algorithm indicating a covariance of a noise; and determine a position estimate of the mobile device at least based on (a) at least some of the obtained plurality of radio measurements or information representative of the plurality of radio measurements and (b) the at least one parameter.

20. The method of claim 12, further comprising setting the at least one parameter utilized by the positioning algorithm for determining the position estimate of the mobile device to a respective third value, in case the motion state corresponds to a third motion type indicating more movement than the second motion type.

21. The method of claim 9, wherein the motion state indicates a probability that the mobile device is moving with one or more motion types of the plurality of motion types.

\* \* \* \* \*

UNITED STATES PATENT AND TRADEMARK OFFICE
CERTIFICATE OF CORRECTION

PATENT NO. : 11,438,861 B2
APPLICATION NO. : 16/596802
DATED : September 6, 2022
INVENTOR(S) : Henri Nurminen et al.

It is certified that error appears in the above-identified patent and that said Letters Patent is hereby corrected as shown below:

On the Title Page

In Column 2, item (57), under ABSTRACT, Line 11, delete "thereof" and insert -- thereof; --, In Column 2, item (57), under ABSTRACT, Line 14, delete "thereof" and insert -- thereof; --.

Signed and Sealed this
Twelfth Day of September, 2023

Katherine Kelly Vidal
*Director of the United States Patent and Trademark Office*